United States Patent [19]
Yoshio et al.

[11] Patent Number: 5,282,186
[45] Date of Patent: Jan. 25, 1994

[54] METHOD AND APPARATUS FOR RECORDING AND REPRODUCING PICTURE INFORMATION AND RECORDING MEDIUM

[75] Inventors: Junichi Yoshio; Sumio Hosaka; Hisao Matsuoka; Youichirou Tsuda; Shoichi Katagiri, all of Tokorozawa; Satoru Nomura, Yamanashi, all of Japan

[73] Assignee: Pioneer Electronic Corporation, Tokyo, Japan

[21] Appl. No.: 8,851

[22] Filed: Jan. 25, 1993

Related U.S. Application Data

[63] Continuation of Ser. No. 294,001, Jan. 6, 1989, abandoned.

[30] Foreign Application Priority Data

Apr. 25, 1988 [JP] Japan ................. 63-102176

[51] Int. Cl.$^5$ ............................... G11B 7/00
[52] U.S. Cl. ........................... 369/48; 358/335; 358/342; 369/58
[58] Field of Search ..................... 360/14.1–14.3, 360/27, 32, 33.1, 40, 48, 77.14; 358/183, 185, 335, 342, 903; 369/32, 44.28, 48–50, 54, 58, 124, 275.3; 371/69.1; 340/723

[56] References Cited

U.S. PATENT DOCUMENTS

| | | |
|---|---|---|
| 4,305,131 | 12/1981 | Best ..................... 364/521 |
| 4,697,176 | 9/1987 | Kawakami ............ 340/723 |
| 4,729,043 | 3/1988 | Worth .................. 358/342 |
| 4,777,539 | 10/1988 | Nomura et al. ....... 358/342 |
| 4,860,272 | 8/1989 | Nishikawa et al. ... 369/44.28 X |
| 4,885,644 | 12/1989 | Ishii et al. ........... 369/58 X |
| 4,899,233 | 2/1990 | Yoshida ............... 360/77.14 |
| 4,942,551 | 7/1990 | Klappert et al. ..... 360/48 X |

FOREIGN PATENT DOCUMENTS

| | | |
|---|---|---|
| 0137855 | 4/1985 | European Pat. Off. . |
| 0165320 | 12/1985 | European Pat. Off. . |
| 56-102182 | 8/1981 | Japan . |
| 61-80690 | 4/1986 | Japan . |

OTHER PUBLICATIONS

Patent Abstracts of Japan, vol. 8, No. 78 (E-237)[1515], Apr. 10, 1984, & JP58225784.
Patent Abstracts of Japan, vol. 7, No. 49 (E-161)[1194], Feb. 25, 1983, & JP57197978.
D. R. Tarrant, "Teletext for the World", IEEE Transactions on Consumer Electronics, vol. CE-32, No. 3, pp. 524–532, Aug. 1986.

Primary Examiner—W. R. Young
Attorney, Agent, or Firm—Keck, Mahin & Cate

[57] ABSTRACT

Method and apparatus of recording and reproducing picture information on a recording medium. In addition to a coded information signal, subcodes together with identification codes for identifying the coding system of the subcodes are recorded in a first recording area of a recording medium and the identification codes and content discrimination codes for indicating contents of information included in the subcode using the coding system indicated by the identification code are recorded in a second recording area of the recording medium. It is further characterized that the identification code and the content discrimination information recorded in the second recording area are displayed at the time of the playback of the recording medium.

16 Claims, 17 Drawing Sheets

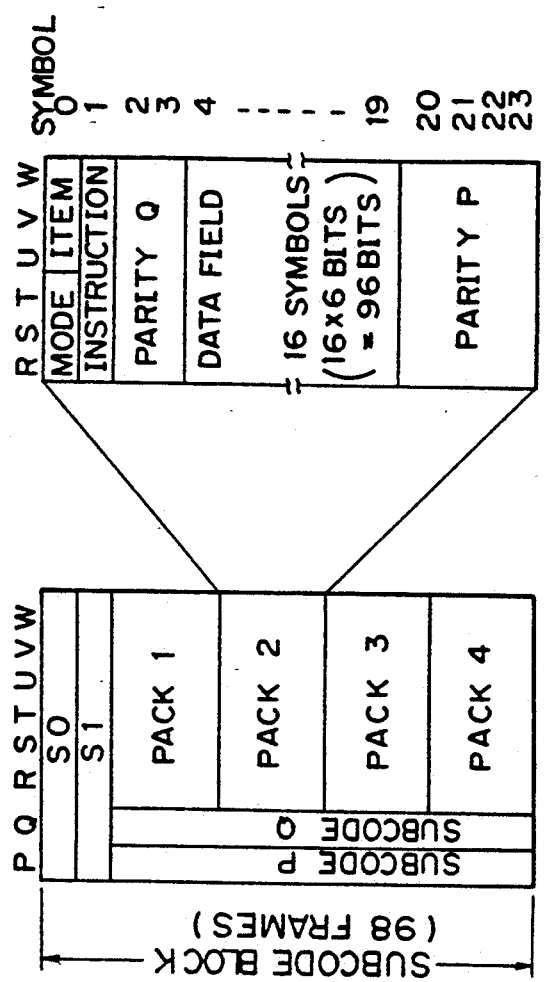
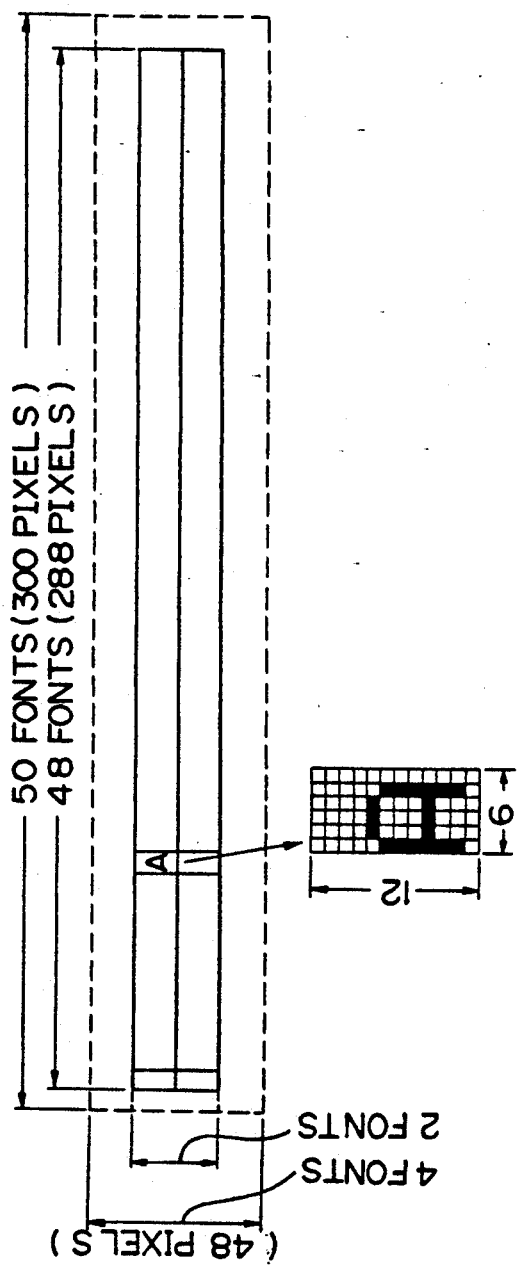
Fig. 1
Fig. 2

Fig. 5

| SYMBOL | R | S | T | U | V | W |
|---|---|---|---|---|---|---|
| 0 | 0 | 0 | 1 | 0 | 0 | 1 |
| 1 | 0 | 1 | 1 | 1 | 1 | 0 |
| 2 | PARITY Q ||||||
| 3 | ||||||
| 4 | COLOR 0 ||||||
| 5 | ||||||
| 6 | ⋮ ||||||
| 17 | ||||||
| 18 | COLOR 7 ||||||
| 19 | ||||||
| 20 | PARITY P ||||||
| 23 | ||||||

Fig. 4

| SYMBOL | R | S | T | U | V | W |
|---|---|---|---|---|---|---|
| 0 | 0 | 0 | 1 | 0 | 0 | 1 |
| 1 | 0 | 0 | 0 | 1 | 1 | 0 |
| 2 | PARITY Q ||||||
| 3 | ||||||
| 4 | CHANNEL ||| COLOR 0 |||
| 5 | CHANNEL ||| COLOR 1 |||
| 6 | 0 || ROW ||||
| 7 | COLUMN ||||||
| 8 | FONT ||||||
| 19 | ||||||
| 20 | PARITY P ||||||
| 23 | ||||||

Fig. 6

| | R | S | T | U | V | W |
|---|---|---|---|---|---|---|
| SYMBOL 0 | 1 | 1 | 1 | 0 | 0 | 0 |
| 1 | CODING SYSTEM ||||||
| 2 | PARITY Q ||||||
| 3 | ||||||
| 4 | CHANNEL |||| 0 | 0 |
| 5 | 0 | ROW |||||
| 6 | COLUMN ||||||
| 7 | $b_0$ | $b_1$ | $b_2$ | $b_3$ | $b_4$ | $b_5$ |
| 8 | $b_6$ | $b_7$ | $b_8$ | $b_9$ | $b_{10}$ | $b_{11}$ |
| 9 | $b_{12}$ | $b_{13}$ | $b_{14}$ | $b_{15}$ | 0 | 0 |
| 10 | 0 | ROW |||||
| 11 | COLUMN ||||||
| 12 | $b_0$ | $b_1$ | $b_2$ | $b_3$ | $b_4$ | $b_5$ |
| ⋮ | ||||||
| 18 | $b_6$ | $b_7$ | $b_8$ | $b_9$ | $b_{10}$ | $b_{11}$ |
| 19 | $b_{12}$ | $b_{13}$ | $b_{14}$ | $b_{15}$ | 0 | 0 |
| 20 | PARITY P ||||||
| ⋮ | ||||||
| 23 | ||||||

| T C B | MODE | SUBCODE PICTURE | MOTION PICTURE |
|---|---|---|---|
| 0 0 | TRANSPARENT MODE | 0 % | 100 % |
| 1 0 | MIXING MODE | M % | (100-M) % |
| 1 1 | NON-TRANSPARENT MODE | 100 % | 0 % |

Fig.11

| MODE | ITEM | |
|---|---|---|
| 0 0 0 | 0 0 0 | ZERO MODE |
| 0 0 1 | 0 0 0 | LINE-GRAPHICS MODE |
| 0 0 1 | 0 0 1 | TV-GRAPHICS MODE |
| 0 0 1 | 0 1 1 | GRAPHICS MODE WITH MOTION PICTURE |
| 1 1 1 | 0 0 0 | USER'S MODE |

Fig.12

| SYMBOL | R | S | T | U | V | W |
|---|---|---|---|---|---|---|
| 0 | 0 | 0 | 1 | 0 | 1 | 1 |
| 1 | 0 | 1 | 1 | 1 | 0 | 0 |
| 2 | PARITY Q | | | | | |
| 3 | | | | | | |
| 4 | TCB-0 | | TCB-1 | | TCB-2 | |
| 5 | TCB-3 | | TCB-4 | | TCB-5 | |
| 6 | TCB-6 | | TCB-7 | | TCB-8 | |
| 7 | TCB-9 | | TCB-10 | | TCB-11 | |
| 8 | TCB-12 | | TCB-13 | | TCB-14 | |
| 9 | TCB-15 | | 0 | 0 | 0 | 0 |
| 10 | 0 | 0 | 0 | 0 | 0 | 0 |
| ⋮ | ⋮ | | | | | |
| 19 | 0 | 0 | 0 | 0 | 0 | 0 |
| 20 | PARITY P | | | | | |
| ⋮ | | | | | | |
| 23 | | | | | | |

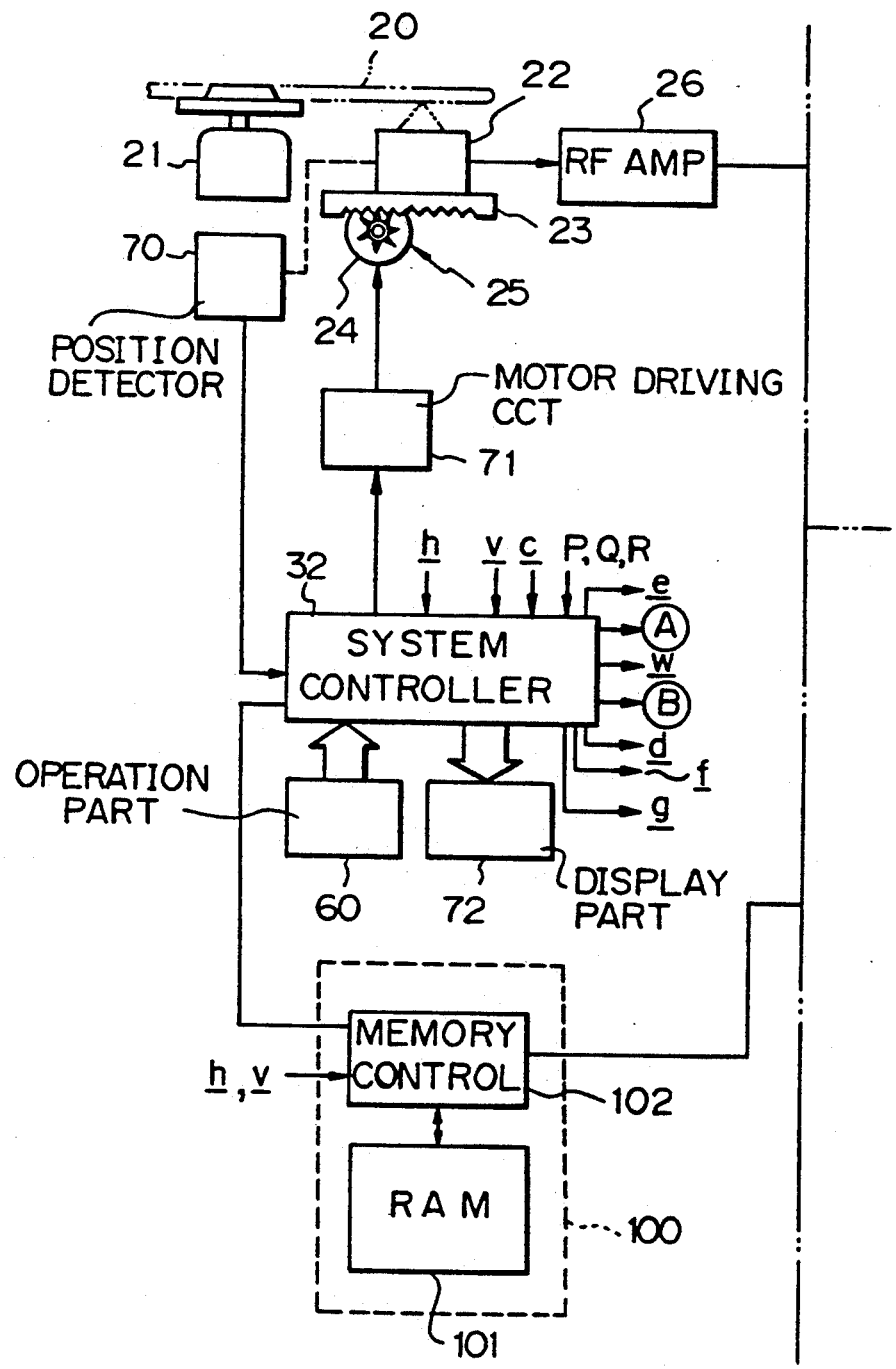
Fig. 14A
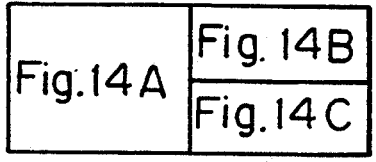

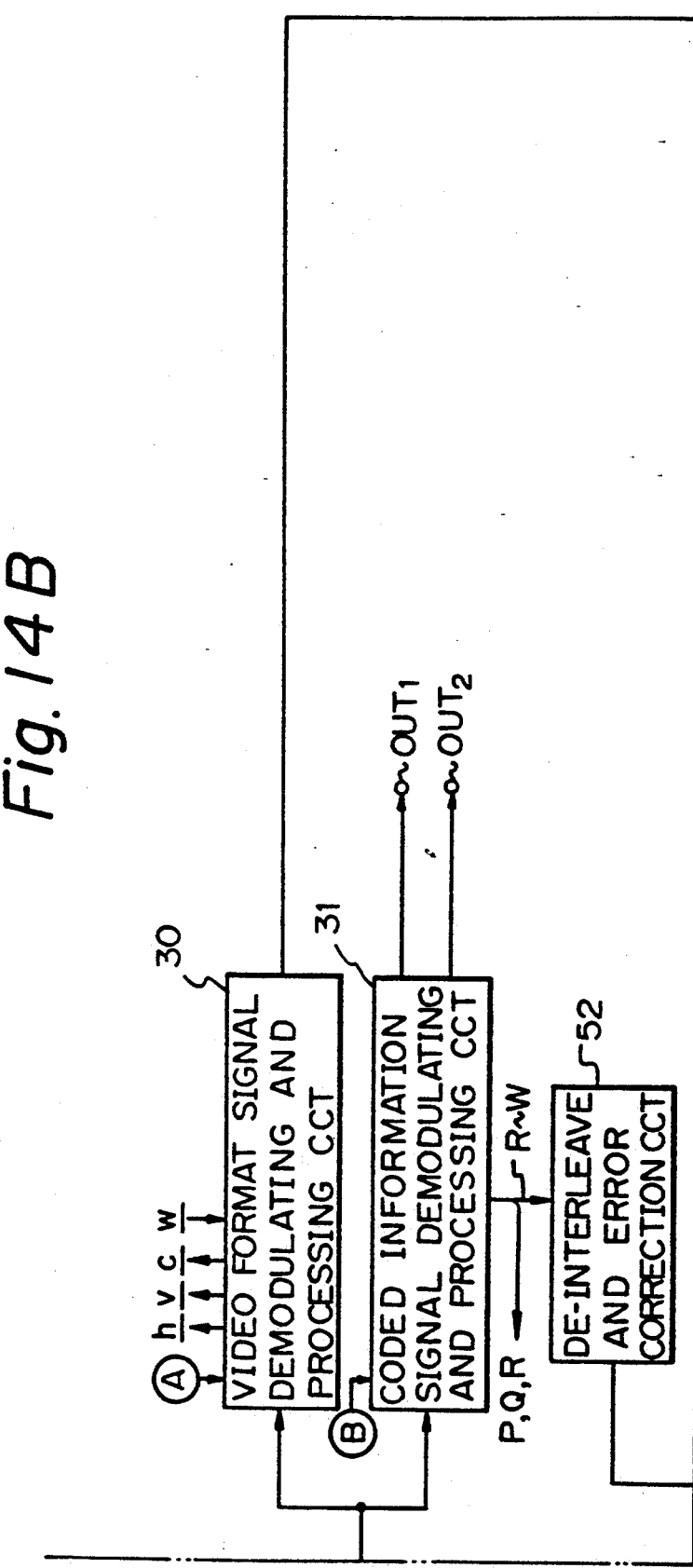

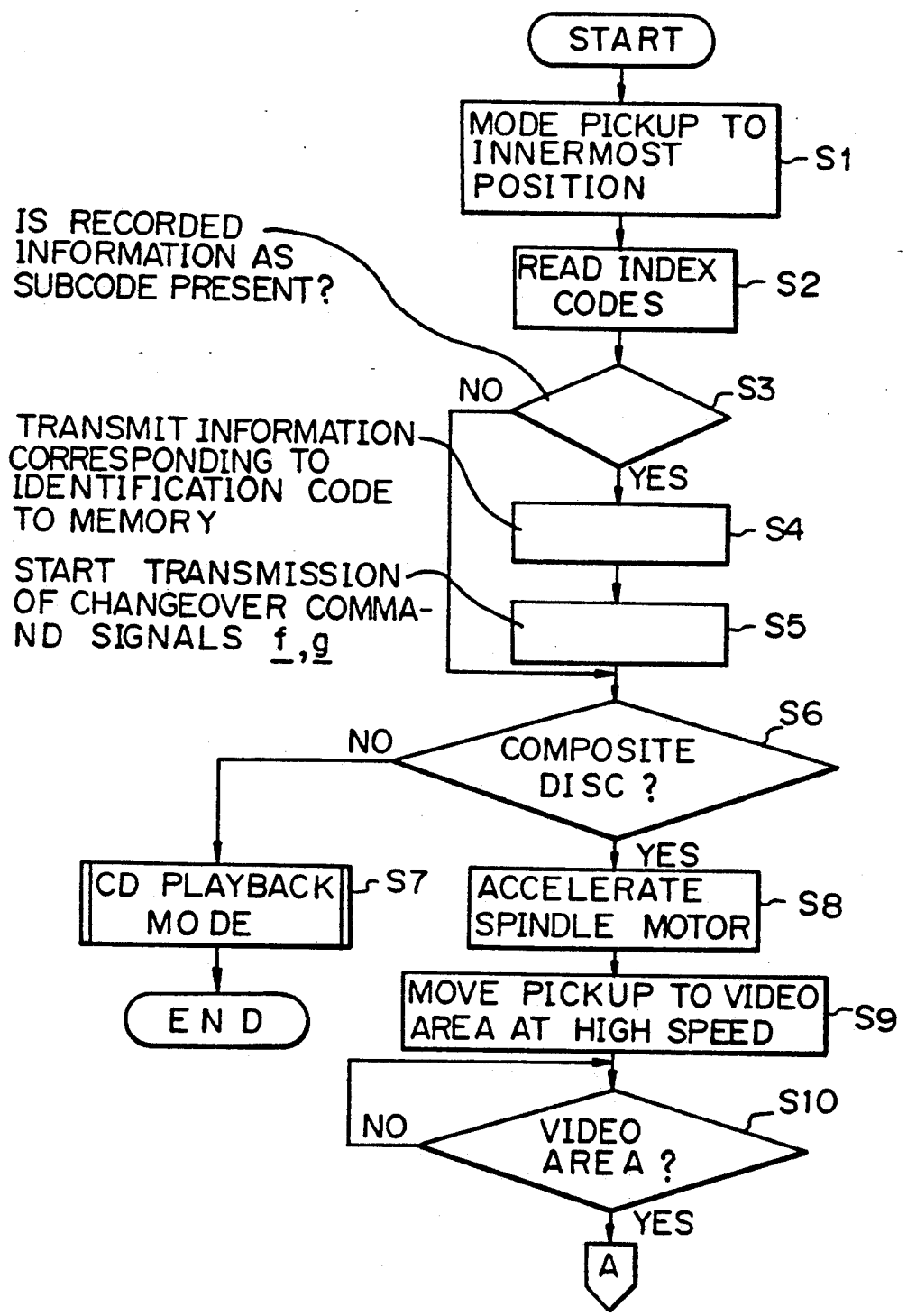

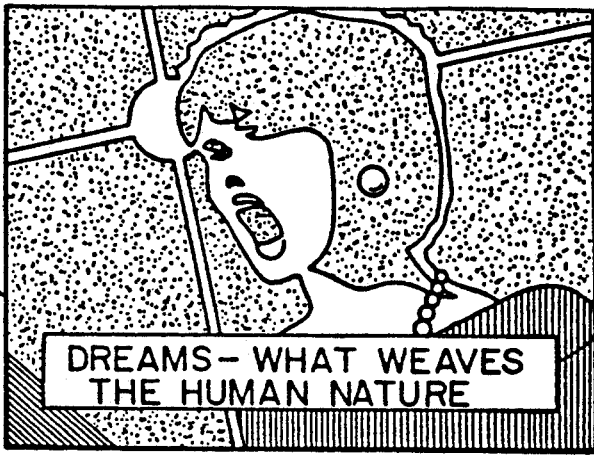
Fig. 20A — MOVING PICTURE / SUBCODE
"DREAMS— WHAT WEAVES THE HUMAN NATURE"
Fig. 20B — MOVING PICTURE / SUBCODE
Fig. 20C — MOVING PICTURE / SUBCODE
"AT THAT MOMENT GODZILLA TURNED ABOUT"

METHOD AND APPARATUS FOR RECORDING AND REPRODUCING PICTURE INFORMATION AND RECORDING MEDIUM

This is a continuation of application Ser. No. 07/294,001, filed Jan. 6, 1989, now abandoned.

BACKGROUND OF THE INVENTION

1. Field of the Invention

The present invention relates to method and apparatus of recording and reproducing picture information on and from a recording medium such as a video disc, a digital audio disc, and so on, and to a recording medium.

2. Description of Background Information

A system is proposed in which picture information is recorded and reproduced in the form of the subcode on and from a digital audio disc having a diameter of 12 cm, generally called compact disc (abbreviated as CD hereinafter). The subcode is made up of eight subcode bits, and bit groups forming the subcode are divided into eight channels denoted by letters P, Q, R, S, T, U, V, and W respectively. In the method in which the picture information is recorded and reproduced in the form of the subcode, data corresponding to picture information is configured such that a symbol is formed by 6 bits of channels R through W from among the 8 bits forming the subcode, and 98 symbols are treated as one block, as illustrated in FIG. 1. Two symbols in the 98 symbols are used as a sync signal, and 24 symbols obtained by dividing the remaining 96 symbols by four are treated as a minimum unit of data, i.e. a "pack", which constitutes one instruction of the picture processing.

More specifically, the first symbol (referred to as symbol 0 hereinafter) of the 24 symbols shows one of several modes. A symbol 1 following this symbol 0 forms "instruction" which indicates the sort of the instruction. Symbols 2 and 3 following the symbol 1 constitute a parity Q which is an error correction code. Symbols 4 through 19 following the parity Q constitute a data field, and include information such as color information. Finally, symbols 20 through 23 following the data field constitute a parity P which is an error correction code for protecting the information in the "pack".

On the other hand, there are four modes, i.e. "zero mode", "line-graphics mode", "TV-graphics mode", and "user's mode". The "zero mode" is provided for a case where no operation is required for pictures on the display screen, that is, pictures are to be maintained as they are, and all data in the "pack" are 0 for this mode.

The "line-graphics mode" is provided for such a case that a liquid crystal display is provided on the front face of the player, to display notes such as an explanation of a music selection. As shown in FIG. 2, a picture area elongated sideways is formed by pixels which are arranged in 288 columns and 24 rows. In other words, each row includes 288 pixels and each column includes 24 pixels. The term "pixel" means the minimum display element of a picture, and it is general that the picture processing is performed by using picture composing units designated as "fonts" each of which is made up of pixels divided into 6 columns and 12 rows.

The number of "fonts" which can be displayed in the "line-graphics mode" is 48 in the lateral direction, and 2 in the column direction, and this area is designated as "screen area". For providing the scroll function, a line of "fonts" is added to the upper and lower outer peripheries and the right and left peripheries of the "screen area", to form a picture area having 50 "fonts" in the row direction, and 4 "fonts" in the column direction. The subcode is formed so that the picture processing is performed by using a memory having addresses each corresponding to each pixel in this picture area. In addition, the area outside the "screen area" is designated as "border".

The "TV-graphics mode" is a mode for displaying images on the TV screen, and a picture is formed by pixels arranged in 192 rows and 288 columns as illustrated in FIG. 3. The number of "fonts" which can be displayed in the "TV-graphics mode" is 48 in the direction of row, and 16 in the direction of column. Also in this "TV-graphics mode", the subcode is formed so that the picture processing is performed by using a memory having addresses each of which corresponds to each pixel in a picture area having 50 "fonts" in the direction of row, and 18 "fonts" in the direction of column, made by adding a line of "fonts" to the upper and lower peripheries as well as the right and left outer peripheries of the "screen area".

As instructions for the picture processing, there are an instruction for painting out the whole picture area by one certain color, an instruction for drawing a picture in one "font" on the screen by using two different colors, an instruction for moving the whole picture upward, downward, or sideways, and so on.

Additionally, in the 8-bit groups forming the subcode, the Q bits forming the channel Q include time information corresponding to the track length to a certain position of each information data which is recorded from the beginning of the program area of CD, and form address time data which can be used as positional data representing the recording position. On the other hand, the P bits forming the channel P provide data including information relating to a pause between two music selections.

In the above-described system of recording and reproducing picture information as the subcode, as many as sixteen picture channels can be designated. Specifically, a "write font foreground/back-ground" instruction is used in the "TV-graphics mode", which has such a structure as illustrated in FIG. 4. This is an instruction for writing font data of the symbols 8 through 19 in positions having a row address defined by the symbol 6 and a column address defined by the symbol 7. For the pixels whose font data is "0", a color of a color number determined by the "color 0" is designated as a background color. For the pixels whose font data is "1", a color of a color number defined by "color 1" is designated as a foreground color. At the same time, sub-picture channels can be designated by using four bits of the channels R and S of the symbols 4 and 5. By this feature, as many as sixteen picture channels can be designated. Sixteen sorts of picture are previously recorded on a disc for example, and a desired picture channel can be selected on the playing side at the time of playing by this scheme of designating the picture channel.

In addition, the sixteen colors indicated by the color number "0" through "15" are set by a "load CLUT color 0 through color 15 (load color look-up table color 0 through color 15)" instruction The "load CLUT color 0 through color 15" instruction is an instruction having a structure illustrated in FIG. 5, and setting the contents of a color look-up table showing the color of pre-set color numbers or foreground/background color numbers. It is necessary to designate sixteen colors in total. However, since four bits are used respectively for each of RGB to indicate a color, two symbols are required for setting one color. Therefore, eight colors are set by one "pack" at most. With this circumstances, this instruction is divided into two instructions respectively designating eight colors of the first half, and eight colors of the second half.

The instruction code for the colors of the first half, i.e. the color 0 through the color 7, is determined to be "30", and the instruction code for the colors of the second half, i.e. the color 8 through color 15 are determined to be "3!". The mixing of colors for each of the color number is as follows. Red color is represented by four bits of the channels R through U of even symbols allotted to the color number. Green color is represented by four bits, i.e. two bits of the channels V and W following the channels R through U of the even symbols, and two bits of the channels R and S of odd symbols. Blue color is represented by four bits of channels T through W following the channels R and S of the odd symbols. Therefore, $2^4$ (=16) sorts of gray scales are available for each color, and preparation of $16^3$ (=4096) colors is possible since three colors (RGB) are used. In addition, a gray scale "0000" corresponds to the darkest state, and a gray scale "1111" corresponds to the brightest state.

In the above-described system of recording picture information as the subcode, the recording of picture is performed by recording data indicative of the color of each pixel on the recording medium. Hence, the density of recorded information is rather small. Furthermore, the time period necessary for displaying a picture of one "font" is about 3.3/1000 second, and about 2.5 seconds are necessary for displaying 48 × 16 characters. For this reason, if the codes occupying each of the sixteen channels are, for example, graphic codes corresponding to words in different languages, there would be a problem that the timing error between the words displayed by the picture channel and the sound becomes large.

Therefore, it is conceivable to record and reproduce codes representing letters by a coding system different from the above-described system of recording and reproducing picture information as the subcode, for example, to record and reproduce JIS codes as the subcode. However, the maximum number of the sorts of recording information increases in such a case and it is surmisable that the selection of desired information becomes difficult.

OBJECT AND SUMMARY OF THE INVENTION

The present invention is based on the recognition of the above described point, and an object of the present invention is to provide a recording and reproducing system in which the recording density of information recorded as the subcode is raised, and the selection of information is facilitated.

In order to attain the above-described object, a recording and reproducing system according to the present invention is characterized in that, in addition to a coded information signal, the subcode is recorded in a first area of a recording medium together with an identification code for identifying the coding system of the subcode, and in that the identification code and content discriminating information indicating the contents of information included in the subcode according to the coding system indicated by the identification code are recorded in a second area of the recording medium.

It is desirable to display, at the time of playback of the recording medium, the identification code and content discriminating information recorded in the second area.

BRIEF DESCRIPTION OF THE DRAWINGS

FIG. 1 is a diagram showing the recording format of the subcode;

FIG. 2 is a diagram showing the structure of picture in the "line-graphics mode";

FIG. 4 is a diagram showing the construction of "write font foreground/background" instruction;

FIG. 5 is a diagram showing "load color look-up table color 0 through color 7" instruction;

FIG. 6 is a diagram showing the structure of the character data processing instruction of the system according to the present invention;

FIG. 11 is a diagram showing the sort of recording modes;

FIG. 12 is a diagram showing the construction of "load transparency control table";

FIGS. 14A through 14C, when combined, are a block diagram showing an apparatus for reproducing picture information recorded on a disc in accordance with recording and playback method according to the present invention;

FIGS. 14 and 17 are diagrams showing the arrangement of FIGS. 14A through 14C and 17A through 17B, respectively;

FIGS. 17A, 17B and 18 are flowcharts showing the operation of processor in system controller 32 of the apparatus shown in FIGS. 14A through 14C; and FIGS. 19 and 20A through 20C are diagrams showing pictures obtained by the apparatus shown in FIGS. 14A through 14C.

DETAILED DESCRIPTION OF A PREFERRED EMBODIMENT

Figure 3:
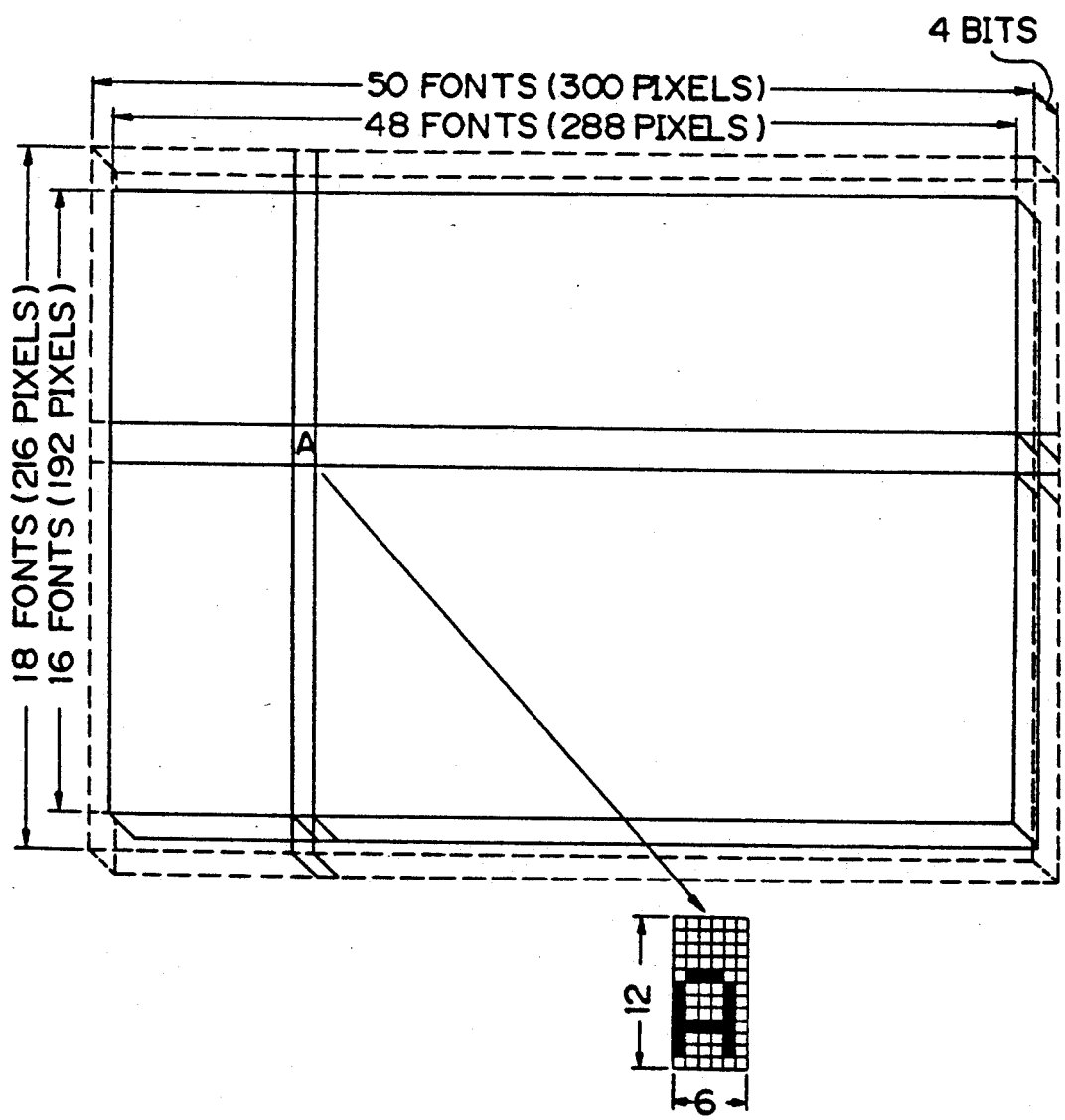
FIG. 3 is a diagram showing the structure of picture in the "TV-graphics mode"

An embodiment of the method according to the present invention will be explained with reference to FIGS. 6 through 20C of the accompanying drawings.

At first, a character data processing instruction as shown in FIG. 6 is set as an instruction in the user's mode which is one of four modes in the picture information recording and reproducing system using the subcode.

In the codes illustrated in FIG. 6, the symbol 0 indicates the mode, and the symbol 1 constitutes an instruction which is made of a code indicating the coding system of character codes in the data field formed by symbols 4 through 19. The symbols 2 and 3 form the parity Q, and four bits of the channels R through U of the symbol 4 represent a character channel. The symbols 5 through 9, the symbols 10 through 14, and the symbols 15 through 19 are respectively made up of character codes $b_0$ through $b_{15}$ each having 16 bits, and codes indicating the row address and the column address of the display position of each character represented by the character codes $b_0$ through $b_{15}$. As the character codes $b_0$ through $b_{15}$, for example, codes according to JIS C 6226 can be used. A character represented by this character code is displayed in an area of 4 fonts in the lateral direction by 2 fonts in the vertical direction, having 8 fonts in total, i.e. an area of 24 pixels by 24 pixels in the lateral and vertical directions, which area including the fonts indicated as the display position.

On the other hand, the symbols 20 through 23 form the parity P.

As explained above, one character data processing instruction includes three character codes respectively representing a character to be displayed in an area covering 24 pixels by 24 pixels in the lateral and vertical directions. Therefore, the recording density is increased $3 \times 8$ times as compared with the system in which one picture processing instruction is required for each font.

Figure 7:
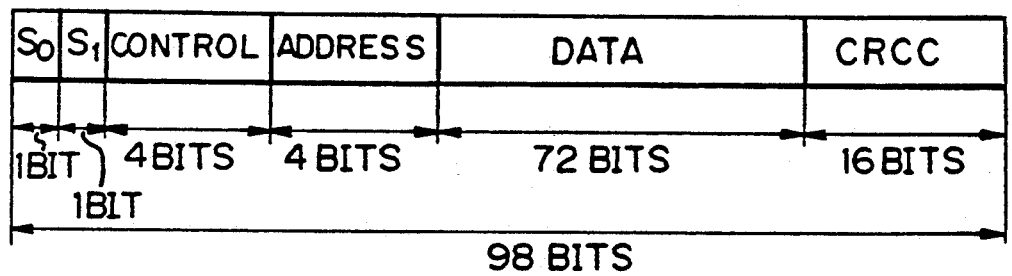
FIG. 7 is a diagram showing the format of the channel R of the subcode recorded in the lead-in area.

When the character information is recorded on a recording disc as the subcode by using this character data processing instruction, the bits of, for example, the channel R of the subcode to be recorded in the lead-in area of the recording disc are recorded in the same format as the bits of the channel Q, as illustrated in FIG. 7. Specifically, the number of bits of the channel R in the subcode frame is 98 as in the case of the channel Q, and 96 bits excepting 2 bits forming the sync signal are divided into four fields, i.e., control field, address field, data field, and CRCC field.

Figure 8:
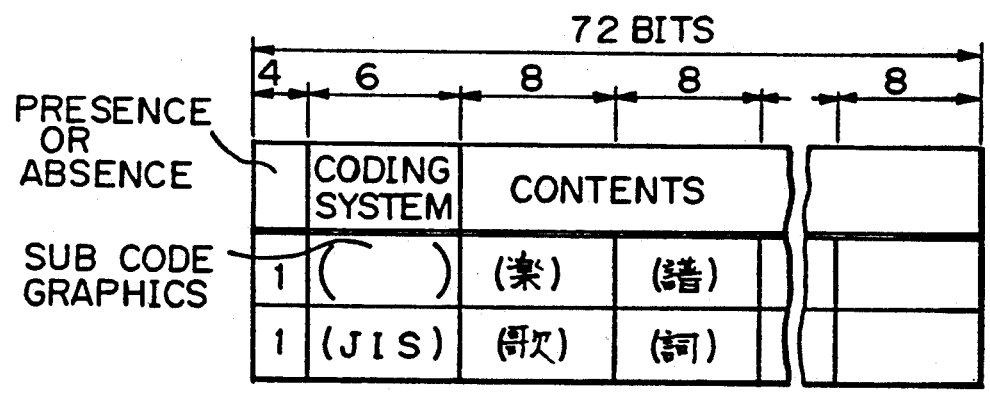
FIG. 8 is a diagram showing the format of the data field.

As shown in FIG. 8, the bits of the data field constitute a code indicating the presence or absence of information recorded as the subcode, a code indicating the coding system of the information recorded as the subcode, and codes respectively representing each of not more than four characters indicating the content of the information recorded as the subcode.

In addition, picture information may be recorded as the subcode together with the character information when the character information is recorded as the subcode on the recording disc by means of the character data processing instruction.

Figure 9:
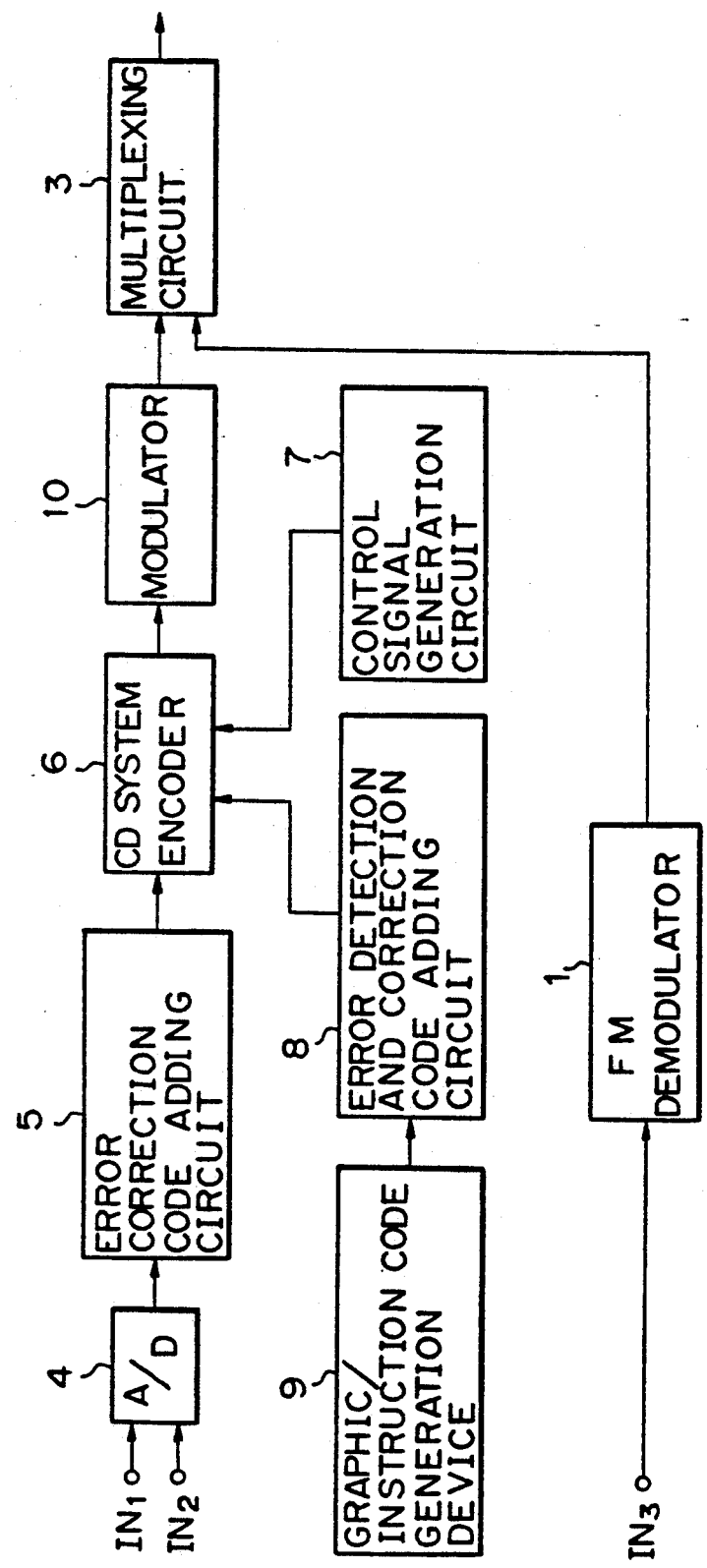
FIG. 9 is a block diagram showing an example of the construction of recording apparatus.

FIG. 9 shows an apparatus for recording the above explained codes on a recording disc by inserting the codes in the subcode.

In the arrangement shown in FIG. 9, two-channel audio signals and a video format signal outputted from a video tape recorder for example, are respectively supplied to input terminals $IN_1$, $IN_2$, and $IN_3$. The video format signal is supplied to an FM modulator 1. In the FM modulator 1, a carrier signal of a predetermined frequency is FM-modulated by the video format signal. An FM signal outputted by this FM modulator 1 is supplied to a multiplexing circuit 3. On the other hand, left and right-channel audio signals are supplied to an analog-to-digital converting circuit 4. The analog-to-digital converting circuit 4 is configured to perform the sampling of each of the left and right-channel audio signals at a sampling frequency of 44.1 kHz for example, to generate two digital data corresponding to two sampled values obtained by the sampling, and to output the digital data after treating them by time division multiplexing. The output data of this A/D converter 4 is supplied to a CD system encoder 6 through an error correction code adding circuit 5 which performs the interleave of the data, the error detection, and addition of codes for the error correction. To the CD system encoder 6, an output signal of the control signal generating circuit 7 and an output signal of the error detection and correction code adding circuit 8 are supplied. The control signal generating circuit 7 is configured to generate data such as a data indicating the time elapsed after the start of the supply of audio signals to the input terminals $IN_2$ and $IN_3$, and a data indicating a pause between music selections or a portion within one music selection of the audio signals.

On the other hand, output data of a graphic/instruction code generation device 9 is supplied to the error correction and correction code adding circuit 8. The graphic/instruction code generation device 9 is configured to record a plurality of codes which are previously inputted by key operations for example, and to read-out and output desired codes. The error detection and correction code adding circuit 8 is configured to perform the interleave and error detection of the output data of the graphic/instruction code generation device 9 and the addition of the correction code.

The CD system encoder 6 is configured to form a recording signal by making the output of the control signal generation circuit 7 data of the channels Q and P, and making the output of the graphic/instruction code generating device through the error detection and correction code adding circuit 8 data of the channels R through W, and inserting those data into the digital data from the A/D converter 4. Output signal of this CD system encoder 6 is supplied to a modulator 10 and converted to an EFM (Eight to Fourteen Modulation) modulation signal. The output signal of this modulator 10 is supplied to the multiplexing circuit 3, and processed by a frequency multiplexing with the FM-modulated video format signal.

The output signal of the multiplexing circuit is supplied to an optical disc recorder of known arrangement (not shown) in which the strength of a light beam irradiated on the recording surface of a disc rotated at a constant linear velocity for example, is modulated by this signal. As a result, the instruction codes are recorded on the recording disc as the subcode of the digital audio signal, in addition to the video format signal and the digital audio signal as the coded information signal.

Figures 10, 13:
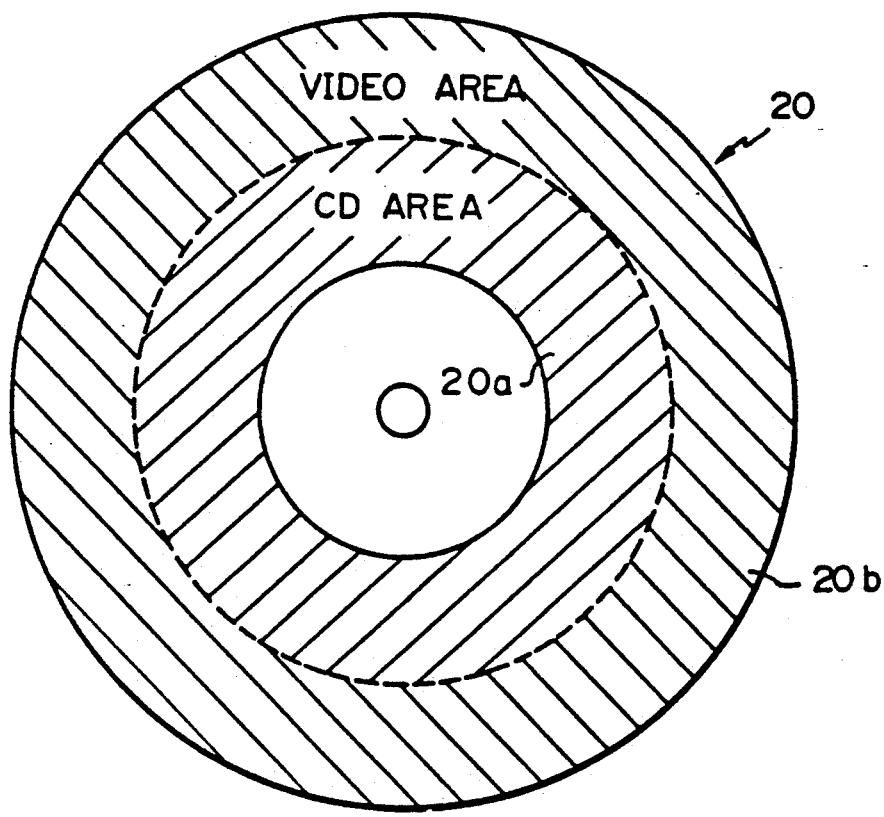
FIG. 10 is a diagram showing the recording area of a composite disc.
FIG. 13 is a diagram showing the correspondency between the bit pattern of TCB and the mixing ratio.

FIG. 10 shows a composite disc 20 carrying a digital audio signal functioning as the coded information signal into which the subcode including picture information, character information, and so on, are inserted as explained above. As shown, the composite disc 20 has a first area 20a disposed in an inner peripheral area of the disc (this area being referred to hereinafter as the CD area) in which is recorded a digital audio signal with the subcode including picture information being inserted, and a second recording area 20b (this area being referred to hereinafter as the video area) containing an FM-modulated video format signal and a superimposed digital audio signal with the subcode including character information being inserted, wherein the superimposition operation is performed by using a frequency multiplexing system. Since the video format signal contains higher frequency components than the PCM signal, it is necessary to rotate the disc at a higher speed of rotation during the recording of signals in the video area 20b, than during the recording of the signal in the CD area 20a. Therefore of course it is necessary, during the playing time, to reproduce the signal by rotating the disc at the higher speed during the playback of video area 20b, than during the playback of CD area 20a. The speed of disc rotation during the playback of CD area 20a is several hundred r.p.m., whereas during the video area playback the speed of rotation is two thousand plus several hundred r.p.m. for playback from the innermost periphery of that area, and is one thousand plus several hundred r.p.m. for playback from the outermost periphery of that area, so that the speed of rotation is extremely high during video area playback.

In the head portions of the CD area 20a and the video area 20b, there respectively are provided a lead-in area in which are recorded, as the subcode, index codes relating to the contents recorded in each area, such as first and second index code groups formed correspondingly to each area by the repetition of index codes which respectively indicate start and end times of small portions which together constitute each area, and which are recorded by means of the channel Q bits of the subcode. In addition, the information as illustrated in FIG. 8 is recorded by means of the channel R bits of the subcode.

Furthermore the index codes of the audio lead-in area include information indicating whether the disc itself is a composite disc or a disc of other type, the information included in predetermined bits, for example, in the control field of the data block constituted by the channel Q bits.

In order that the picture produced from the FM modulated video format signal recorded in the video area and pictures or characters produced from the subcode are displayed in a single screen at the same time, the applicants of the present application and others have separately proposed a system in which a code to be inserted as the symbol 0 is set in order to designate an additional mode as illustrated in FIG. 11, that is, "graphic mode with motion picture" in addition to the four modes used in conventional methods of recording and reproducing picture information by using the subcode.

The structure of picture in the "graphics mode with motion picture" is identical with that in the "TV-graphics mode", and an instruction designated as "load transparency control table" having a structure as illustrated in FIG. 12 is provided. This "load transparency control table" instruction is an instruction for designating the mode for each pixel in picture area. Three modes are designated by this instruction, and those are namely, "transparent mode", "mixing mode", and "non-transparent mode". In these three modes, different values are selected for the mixing ratio between a video format signal obtained by the subcode and a video format signal which is recorded by a multiplexing operation together with the coded information signal including the subcode.

The bits in the channels R through W of each of the symbols 4 through 8 and the channels R and S of the symbol 9 constitute a series of codes TCB-0 through TCB 15 which respectively designate the mode for each of the group of pixels to which one of colors, which are registered as color number "0" through color number "15", is allotted. FIG. 13 shows a relationship between bit patterns of the codes TCB-0 through TCB-15 and the modes designating the mixing ratio, and the mixing ratio in each mode.

Figure 14C:
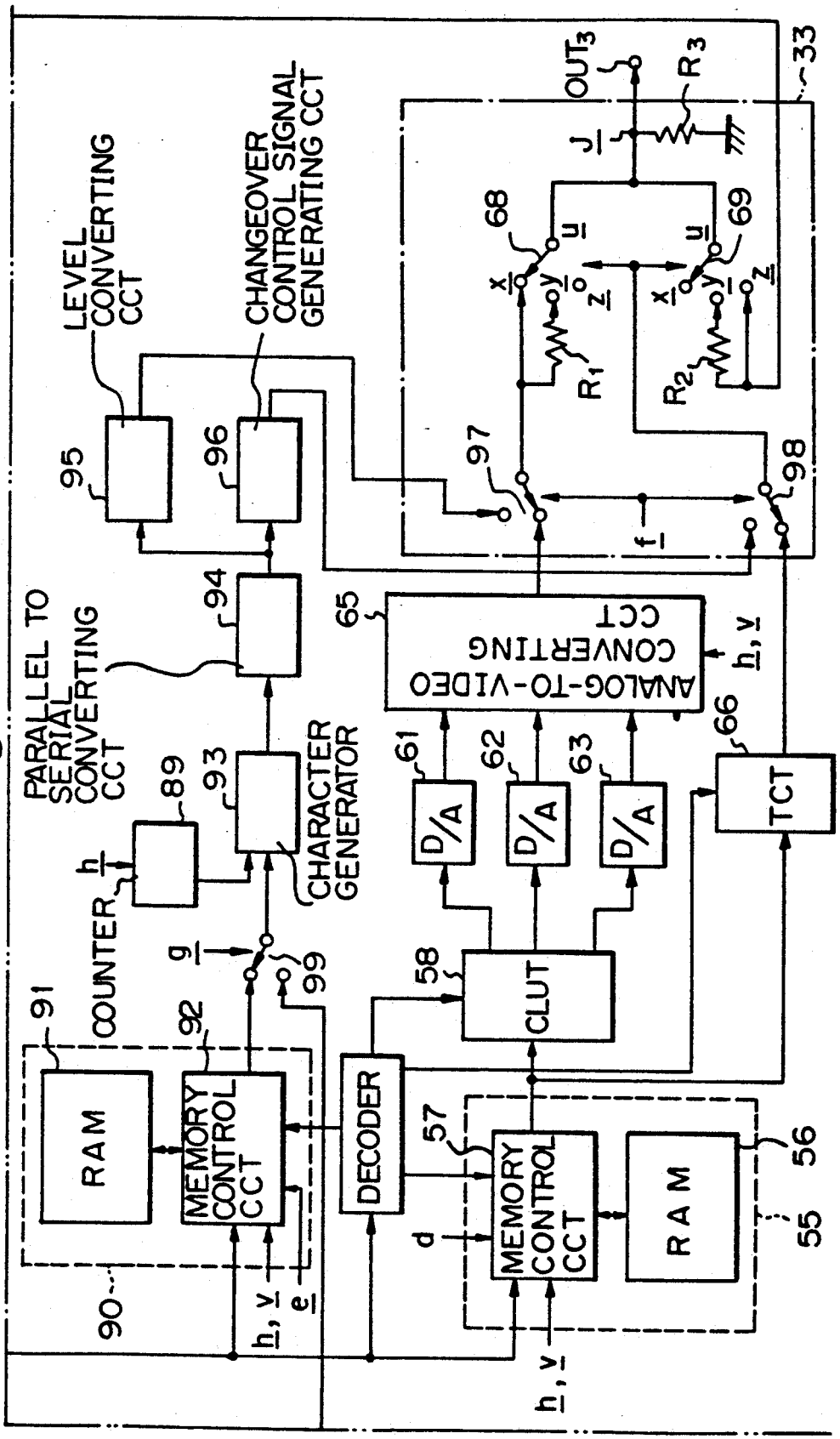

FIGS. 14A through 14C show a disc player for reproducing the information recorded on a composite disc as shown in FIG. 10. As illustrated in these figures, a disc 20 is rotated by a spindle motor 21, and information recorded thereon is read-out by means of a pickup 22. The pickup 22 incorporates therein an optical system including a laser diode, an objective lens, and photo detectors, a focus actuator for driving the objective lens in a direction of its optical axis with respect to the information recording surface of the disc 20, a tracking actuator for biasing the beam spot (information detecting point) issued from the pickup 22 with respect to the recording tracks in a direction of disc radius, and so on. The pickup 22 is mounted on a slider 23 which is linearly movable in the direction of disc radius by a drive of a transmission mechanism 25 which in turn has a slider motor 24 as a source of driving force, and made by a combination of rack and pinion gears. A read-out RF (radio frequency) signal outputted by the pickup 22 is supplied to a video format signal demodulating and processing circuit 30 and a coded information demodulating and processing circuit 31 through an RF amplifier 26.

The video format signal demodulating and processing circuit 30 includes a demodulation circuit which for example demodulates the RF signal and converts it to a video format signal and a memory which stores the video format signal after digitizing it, and configured to selectively output one of the video format signal outputted by the demodulation circuit and the video format signal read-out from the memory in accordance with a changeover command from a system controller 32. The video format signal outputted by the video format signal demodulating and processing circuit 30 is supplied to a video switch 33. In addition, the video format signal demodulating and processing circuit 30 is further provided with a separating circuit which separately extracts a horizontal sync signal h, a vertical sync signal v, and control data c from the demodulated video format signal, and the separated horizontal and vertical sync signals h and v, and the control data c are supplied to each part such as the system controller 32.

On the other hand, the coded information demodulating and processing circuit 31 is configured to demodulate the PCM audio signal contained in the RF signal and process it to produce analog audio signals, and also to separate the subcode of the PCM audio signal and in turn output it.

On the other hand, in the subcode outputted from the coded information signal demodulating and processing circuit 31, the bit of the channel R is supplied to both the system controller 32 and the de-interleave and error correction circuit 52, two bits of the channels P and Q are supplied only to the system controller 32, and six bits of the channels R through W are supplied only to the de-interleave and error correction circuit 52. In the de-interleave and error correction circuit 52, the de-interleave of the six bits of the channels R through W and the error correction using the parity Q and P are performed. Output data of the de-interleave and error correction circuit 52 is supplied to a mode/instruction decoder 53. The mode/instruction decoder 53 is configured to decode the mode represented by the three bits of the channels R through T of the symbol 0 of each pack, the mode designated by the item represented by the three bits of the channels U through W of the symbol 0 of each pack, and the instruction represented by the six bits of the channels R through W of the symbol 1 of each pack, and to supply to each part signals respectively indicative of the modes and the instruction.

Furthermore, the output data of the de-interleave and error correction circuit 52 is supplied to a picture memory device 55 and a character codes memory device 90. The picture memory device 55 includes a RAM 56 having addresses respectively corresponding to all pixels in the picture having 50 "fonts" by 18 "fonts" in the row and column directions, and four bits of data can be stored in each address, and a memory control circuit 57 for sensing data indicating the color number of each pixel of a picture channel, designated by the channel designation code d, in the output data of the de-interleave and error correction circuit 52 by using the kind of the modes and the instruction indicated by the output of the mode/instruction decoder 53 and writing them in the corresponding addresses of the RAM 56, and for reading out the memory content of the RAM 56 sequentially in a predetermined order in accordance with horizontal and vertical sync signals h and v. On the other hand, the character codes memory device 90 comprises a RAM 91 having addresses corresponding to each of font groups made of 8 fonts with 2 fonts in the lateral direction and 4 fonts in the vertical direction, within the picture area of 48 fonts in the lateral direction by 16 fonts in the vertical direction, and a memory control circuit 92 for sensing character codes corresponding to each font group of a character channel designated by the channel designation code e, in the output data of the de-interleave and error correction circuit 52, by using the kind of the modes and the instruction indicated by the output of the mode/instruction decoder 53 and writing them in the corresponding addresses of the RAM 91, and for reading out the memory content of the RAM 91 sequentially in a predetermined order in accordance with horizontal and vertical sync signals h and v.

The data outputted by the picture memory device 55 is supplied to a color look-up table 58 (this table being referred to hereinafter as the CLUT). The CLUT 58 is configured to detect the "load CLUT color 0 through color 7" instruction and the "load CLUT color 8 through color 15" instruction from the output data of the de-interleave and error correction circuit 52 in accordance with the kind of the modes and the instruction indicated by the output signal of the mode/instruction decoder 53, and hold the color data corresponding to each color number, and configured to select and output color data of the color number designated by the data read-out from the picture memory device 55.

The output data of this CLUT 58 is made up of three data respectively representing the level of one of the R, G, B color signals by using four bits. The three data outputted by the CLUT 58 and indicating the levels of the R, G, B color signals are supplied to D/A converting circuit 61, 62, and 63, and converted to analog signals. Output signals of these D/A converting circuits 61 through 63 are supplied to an analog-to-video converting circuit 65. The analog-to-video converting circuit 65 is configured, for example, to form a video signal of the NTSC system by the steps of obtaining a luminance signal and two color difference signals by the output signals of the D/A converting circuits 61 through 63, generating a color carrier signal by adding signals obtained by the parallel modulation of two color subcarrier signal having a phase difference of 90° by means of the two color difference signals, and combining the color carrier signal and the luminance signal by the summation, and adding sync signals thereto. By this analog-to-video converting circuit 65, the output signals of the D/A converting circuits 61 through 63 are converted to a video signal and transmitted subsequently.

Data outputted from the character codes memory device 90 is supplied to one of two input terminals of a changeover switch 99. The other input terminal of the changeover switch 99 receives output data of an identification information memory device 100. The identification information memory device 100 includes a RAM 101 having the same construction as the RAM 91, and a memory control circuit 102 for writing the character code issued from the system controller 32 into designated addresses of the RAM 101, and reading out the stored content of the RAM 101 sequentially in a predetermined order by using the horizontal and vertical sync signals h and v.

The changeover switch 99 is configured to selectively output the data outputted from the character code memory device 90 in the absence of a changeover command signal g from the system controller 32, and to selectively output the data outputted from the identification information memory device 100 in the presence of the changeover command signal g. The output data of the changeover switch 99 is supplied to a character generator 93. To the character generator 93, output data of a modulo-24 counter 89 which counts up by the horizontal sync signal h. The character generator 93 is made up of a ROM whose sixteen most-significant bits of the address data are supplied with the output data of the character data memory device 90 or the identification information memory device 100 and whose five least-significant bits of the address data are supplied with the output data of the modulo-24 counter 89. One character is made of 24 addresses corresponding to address data whose sixteen most-significant bits are in common and only whose five least-significant bits are different. Each of the 24 addresses stores each of 24 pieces of data, having 24 bits respectively, corresponding to luminance signal sections produced by scanning the pattern of a character twenty-four times in the horizontal direction. The output data of the character generator 93 is converted to a serial data by means of a parallel-to-serial converting circuit 94, and in turn supplied to a level converting circuit 95 and a changeover control signal generating circuit 96. The level converting circuit 95 is configured to output a luminance signal corresponding to the black level when the output data of the parallel-to-serial converting circuit 94 is in the low level, and to output a luminance signal corresponding to the white level when the output data of the parallel-to-serial converting circuit 94 is in the high level. The changeover control signal generating circuit 96 is configured to produce a control signal which, for example, is operative to set the mixing ratio of the luminance signal, at a video switch 33 which will be described later, outputted from the level converting circuit 95 at 0% when the output of the parallel-to-serial converting circuit 94 is in the low level, and to set the mixing ratio of the luminance signal at the video switch 33 outputted from the level converting circuit 95 at 100% when the output of the parallel-to-serial converting circuit 94 is in the high level.

In addition, the output data of the de-interleave and the error correction circuit 52 are also supplied to a transparency control table 66 (this table will be referred to hereinafter as the TCT hereinafter). The TCT 66 is based on a picture information recording and reproducing system using the subcode separately propose by the applicants of the present application and others, and configured to detect a "load TCT" instruction in the output data of the de-interleave and error correction circuit 52 in accordance with the kind of the modes and instruction indicated by the output signal of the mode-/instruction decoder 53, hold transparency control bits TCB-0 through TCB-15, and select one of the TCB-0 through TCB-15 being held and corresponding to a color number indicated by the data read-out from the picture memory device 55 and in turn output it.

The output signal of the TCT 66 is supplied to the video switch 33 as a control signal. In addition to the output signal of the TCT 66, the video format signal obtained from the subcode and outputted by the analog-to-video converting circuit 65, and the video format signal outputted by the video format signal demodulating and processing circuit 30, the output of the level converting circuit 95, and the output of the changeover control signal generating circuit 96 are supplied to the video switch 33.

In the video switch 33, the video format signal outputted from the analog-to-video converting circuit 65 is supplied to one of two input terminals of a changeover switch 97. The other input terminal of the changeover switch 97 receives the luminance signal outputted from the level converting circuit 95. The changeover switch is configured to selectively output the video format signal from the analog-to-video converting circuit 65 when a changeover command signal f from the system controller 32 is not present, and selectively output the luminance signal from the level converting circuit 95 when the changeover command signal f is present. The output of the changeover switch 97 is supplied directly to a stationary contact $x$ of a changeover switch 68, and also supplied to its stationary contact $v$ through a resistor $R_1$. No connection is made to a stationary contact $z$ of the changeover switch 68. The changeover switch 68 is configured to selectively output one of the signals supplied to its stationary contacts $x$, $y$, $z$ by moving its movable contact $u$ to be in contact with one of the stationary contacts $x$, $v$, $z$ in accordance with a control signal supplied from a changeover switch 98. The changeover switch 98 has two input terminals which respectively receive the control signal issued from the TCT 66 and the control signal issued from the changeover control signal generating circuit 96. The changeover switch 98 is configured to selectively output the control signal from the TCT 66 when the changeover command signal f from the system controller 32 is not present, and to selectively output the control signal from the changeover control signal generating circuit 96 when the changeover command signal f is present.

The video format signal outputted from the video format signal demodulating and processing circuit 30 is directly supplied to a stationary contact $z$ of a changeover switch 69 and also supplied to its stationary contact $y$ through a resistor $R_2$. No connection is made to a stationary contact $x$ of the changeover switch 69. The changeover switch 69, like the changeover switch 68, is configured to move its movable contact $u$ to be in contact with one of its stationary contacts $x$, $y$, $z$ in accordance with the control signal supplied from the changeover switch 98. The movable contacts $u$, $u$ of the changeover switches 68 and 69 are mutually connected. A resistor $R_3$ is connected between a common junction J of the movable contacts $u$, $u$ and ground. A mixed signal of the output of the changeover switch 97 and the video format signal outputted from the video format signal demodulating and processing circuit 30 is derived at the common junction J. When the movable contacts $u$, $u$ of the changeover switches 68 and 69 are in contact with the stationary contacts $x$, $x$ respectively, the mixing ratio of the output signal of the changeover switch 97 becomes 100%, and the mixing ratio is reduced to 0% when the movable contacts $u$, $u$ are in contact with the stationary contacts $z$, $z$. When, on the other hand, the movable contacts $z$, $z$ are in contact with the stationary contacts $y$, $y$, the mixing ratio is equal to M which is determined by the resistors $R_1$ and $R_2$, and the resistance of the resistors $R_1$ and $R_2$ are selected so that M has a value between 20% and 80%. The signal derived at the common junction J is supplied to a video output terminal $OUT_3$.

A position detector 70 is provided in the vicinity of the path of the movement of pickup 22 along the radial direction of disc, and serves to detect when the beam spot emitted from the pickup 22 has reached a position corresponding to the vicinity of the boundary between the CD are and the video area of a composite disc, to produce a detection signal. By the generation of this detection signal, a state that the pickup 22 has reached to the video area can be detected. The position detector 70 can be of a known structure including for example an optical sensor. The detection signal outputted by the position detector 70 is supplied to the system controller 32.

The system controller 32 comprises a microcomputer which consists of a processor, a ROM (read only memory), a RAM and so on. The system controller 32 is supplied with various signals and information such as the horizontal sync signal h, the vertical sync signal v, and the control data c, the bits of the channels P, Q, and R in the subcode outputted from the coded information signal demodulating and processing circuit 31, disc designation information from the control part 60 indicating whether the disc to be played is a compact disc or a composite disc, and mode designation information from the operation part 60, indicating whether the reproducing area is only the CD area or the video area, or both CD and video areas in the case of the playback of a composite disc.

In this system controller 32, the processor executes processing of the signals inputted in accordance with programs previously stored in the ROM, and performs the control operation for controlling each part of the video format signal demodulating and processing circuit 30, each part of the coded information signal processing circuit 31, a drive circuit (not shown) for driving the spindle motor 21, the memory control circuits 57, 92, 102, a motor driving circuit 71 for driving the slider motor 24, the display part 72, and the changeover switches 97, 98 and 99.

Figure 15:
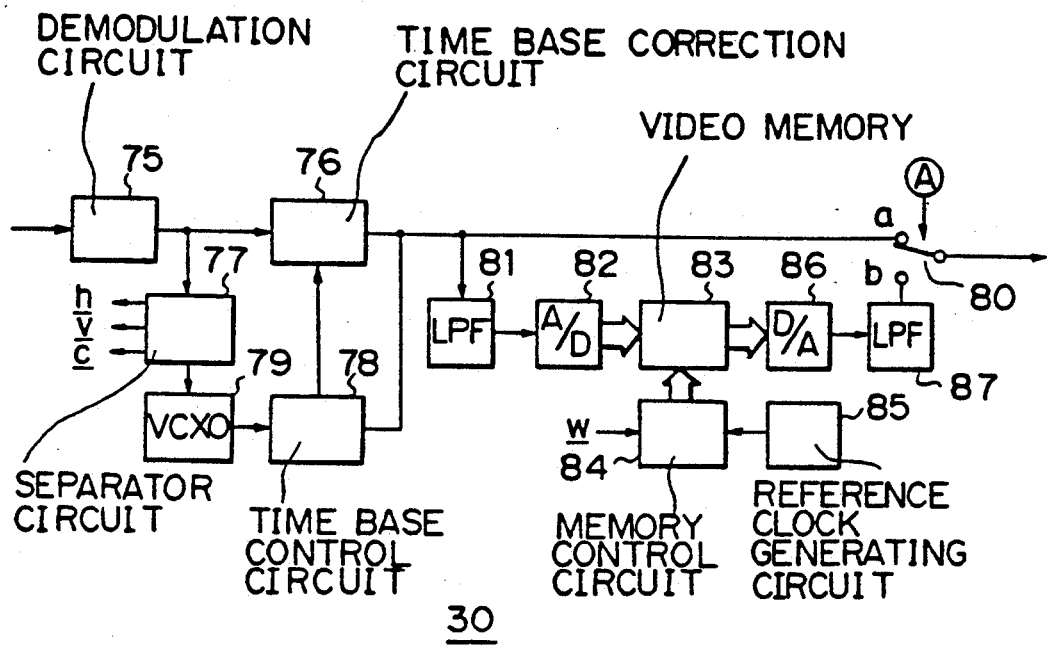
FIG. 15 is a block diagram showing a specific configuration of video format signal processing circuit 30 in the apparatus shown in FIGS. 14A through 14C.

FIG. 15 is a block diagram showing a specific circuit construction of the video format signal demodulating and processing circuit 30. As shown, the RF signal from the RF amplifier 26 is demodulated at a demodulation circuit 75, then supplied to a time base correction circuit 76 and to a separator circuit 77. In the separator circuit 77, the horizontal sync signal h, the vertical sync signal v and the control data c which are contained in the video format signal are extracted. The separator circuit 77 includes an oscillator for example, and configured to generate the horizontal sync signal h and the vertical sync signal v of predetermined frequencies respectively by means of the oscillator, and output them when the video format signal is not supplied. The time base correction circuit 76 consists, for example, of a variable delay element of e.g. CCD (charge coupled device) and configured to vary the delay amount of that element in accordance with a control signal from a time base control circuit 78. The time base control circuit 78 is configured to output as the control signal a signal corresponding to a phase difference between an oscillation signal and its divided signal of a crystal oscillator (VCO) 79 which oscillates, for example, in synchronism with the horizontal sync signal h extracted at the separator circuit 77, and the horizontal sync signal and the color burst signal of the video signal transmitted through the time base correction circuit 76. For more specific configuration, reference is directed for example to Japanese patent application laid-open number P56-102182.

The video signal having been processed by the time base correction operation is used as one input of a selector switch 80, and also supplied to an A/D converter 82 through an LPF (Low Pass Filter) 81. In the A/D converter 82, the sampling of the video signal is performed at intervals of a predetermined period, and the thus obtained sampled values are in turn converted to digital data. The output data of the A/D converter 82 is supplied to a video memory 83 consisting of a RAM (random access memory) and so on. A memory having a capacity for storing video information of at least one field long is used as the video memory 83. Address and mode controls of this video memory 83 are performed by a memory control circuit 84. The memory control circuit 84 is configured to perform control operations for sequentially reading-out data written in each address of the video memory 83 in accordance with a clock from a reference clock generating circuit 85, and for rewriting the contents of each address of the video memory 83 in response to a write enable signal w which is outputted from the system controller 32. The data read-out from the video memory 83 is converted to an analog signal in a D/A (digital to analog) converter 86, and supplied through an LPF 87 as the other input to the selector switch 80. The selector switch 80 is normally held at a position a to selectively output the video format signal directly supplied from the time base correction circuit 76, and switched to a position b in response to a changeover command from the system controller 32, to selectively output the video format signal having been processed through the video memory 83.

Figure 16:
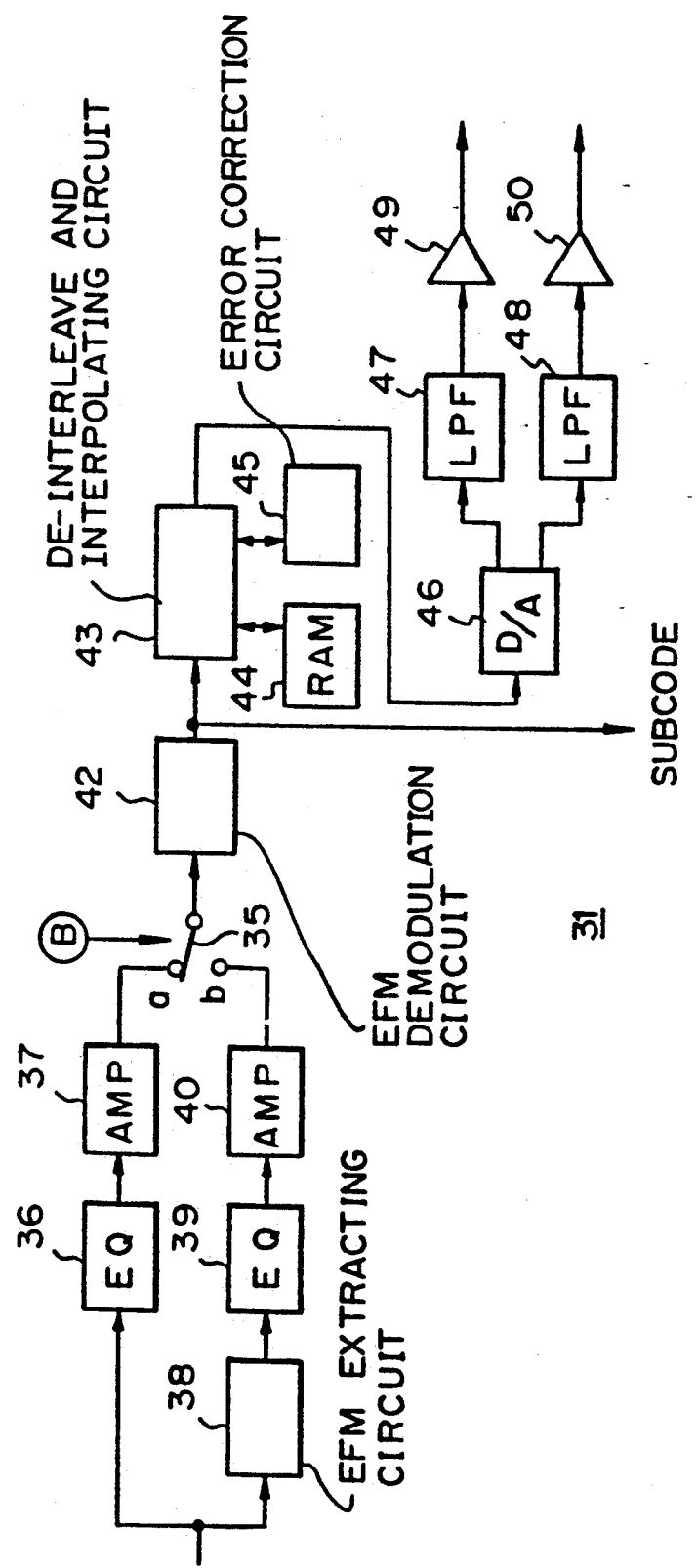

FIG. 16 is a block diagram showing a specific example of the structure of the coded information signal demodulating and processing circuit 31. This circuit is provided with a selector switch 35 which changes its switch position in accordance with the area to be played (the CD area or the video area) during the playing of a composite disc. The selector switch 35 is operated to a position a during the playback of the CD area, and to a position b during the playback of the video area, and the changeover is performed in response to a changeover command issued from the system controller 32. In the case of the composite disc, the speed of disc rotation changes extremely between the CD area and the video area, and the PCM audio signal is for example an EFM (Eight to Fourteen Modulation) signal. For the video area, the EFM signal will adversely affect on the low frequency component of the video signal treated by the FM modulation process if the digital signal is directly superimposed on the FM video signal at the time of recording. Therefore, the digital signal, i.e. the EFM signal is recorded at a level which is lower than the video carrier level by several tens of dB, although the degree of modulation is almost the same for the EFM and video signals. Thus the frequency characteristic and amplitude of a playback EFM signal will both be different, for the cases of CD area playback and video area playback respectively. However, a common demodulating system is used for the CD area playback and the video area playback. This is made possible by switching signal processing systems for the playback EFM signals of the CD area and the video area respectively.

Specifically, during playback of the CD area, the playback RF signal is an EFM signal, which is subjected to frequency characteristic compensation by an equalizer circuit 36 having a predetermined equalizing characteristic, and is amplified at a predetermined amplification factor by an amplifier 37. During the playing of the video area, on the other hand, the playback RF signal is an FM video signal which is combined with an EFM signal. The EFM signal is extracted by an EFM signal extracting circuit 38 which is made up of an LPF and so on, then is subjected to frequency characteristic compensation by an equalizer circuit 39, which has a different equalization characteristic from the equalizer circuit 36, to be then amplified by an amplifier 40, which has a higher gain than that of the amplifier 37. In this way, an EFM signal is derived whose frequency characteristic and amplitude are almost the same as the EFM signal obtained during CD area playback.

During playback of a CD disc, the selector switch 35 is held in position a.

The playback EFM signal selected by the selector switch 35 is supplied to an EFM demodulation circuit 42 which performs the demodulation process, to obtain a PCM data that is digital data including audio information of left and right channels which is for example time-division multiplexed, and the subcode. The digital data including audio information outputted by this EF demodulation circuit 42 is supplied to a de-interleave and interpolating circuit 43. The de-interleave an interpolating circuit 43 is configured to change back, in cooperation with the RAM 44, the order of the digital data which was rearranged by the interleave operation during the recording, in turn send it to an error correction circuit 45, and to effect the interpolation of erroneous data in the output data of the error correction circuit 45 by the average value interpolation method for example, when a correction inability signal is outputted. The error correction circuit 45 is configured to perform the error correction operation by using the CIRC (Cross Interleave Reed Solomon Code), and supply the digital data to the de-interleave and interpolating circuit 43, or supply the digital data to the de-interleave and interpolating circuit 43 together with the correction inability signal when the error correction is not possible.

The output data of the de-interleave and interpolating circuit 43 is supplied to a D/A (Digital to Analog) converting circuit 46. The D/A converting circuit 46 includes a de-multiplexer which separates from each other the digital data of left and right-channel audio information combined by the time division multiplexing, and left and right-channel audio signals are reproduced. After their unnecessary components are removed at LPFs (Low Pass Filters) 47 and 48, the reproduced left and right-channel audio signals are supplied to audio output terminals OUT1 and OUT2 through amplifiers 49 and 50.

Figure 17B:
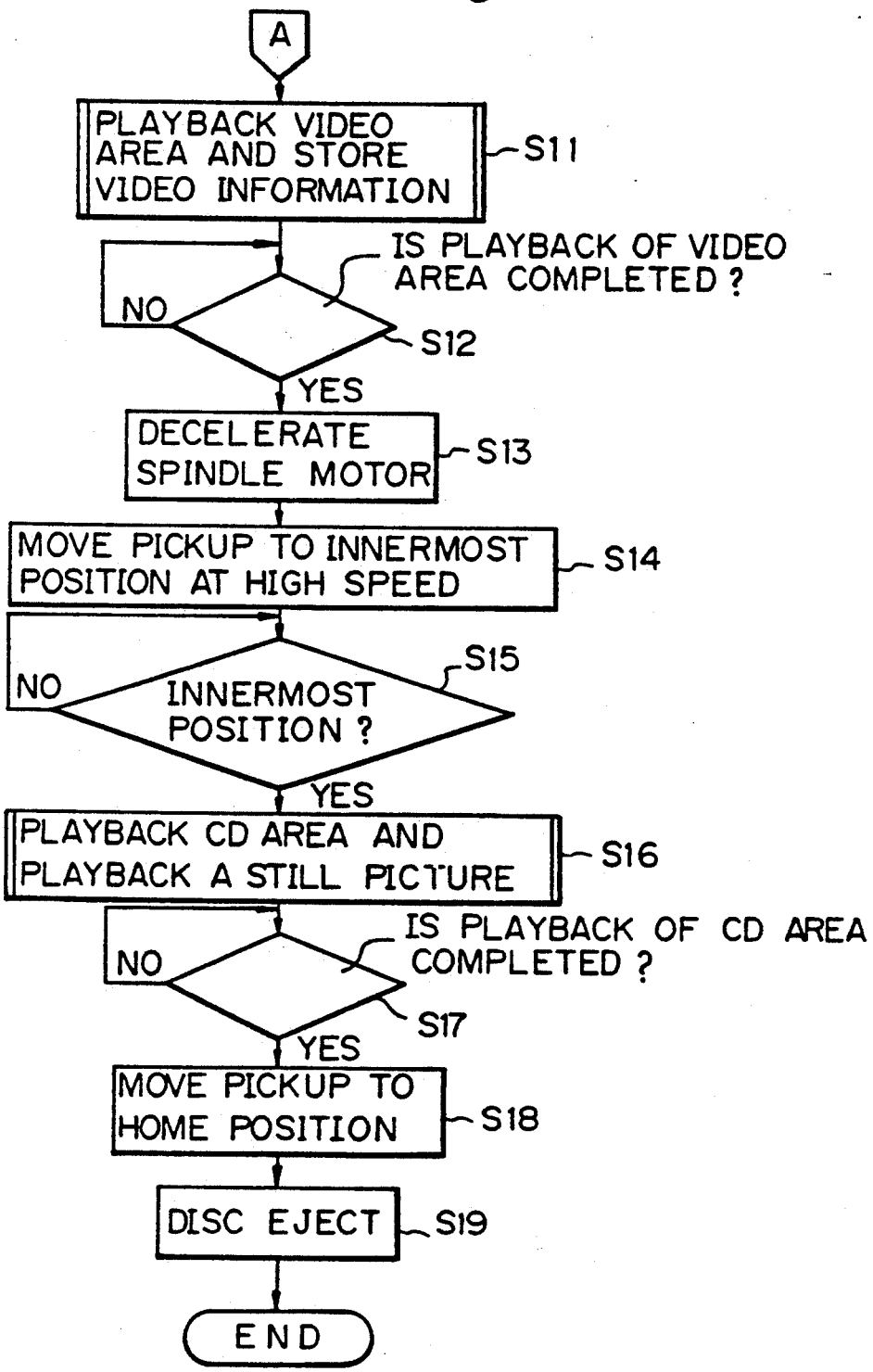
Figure 18:
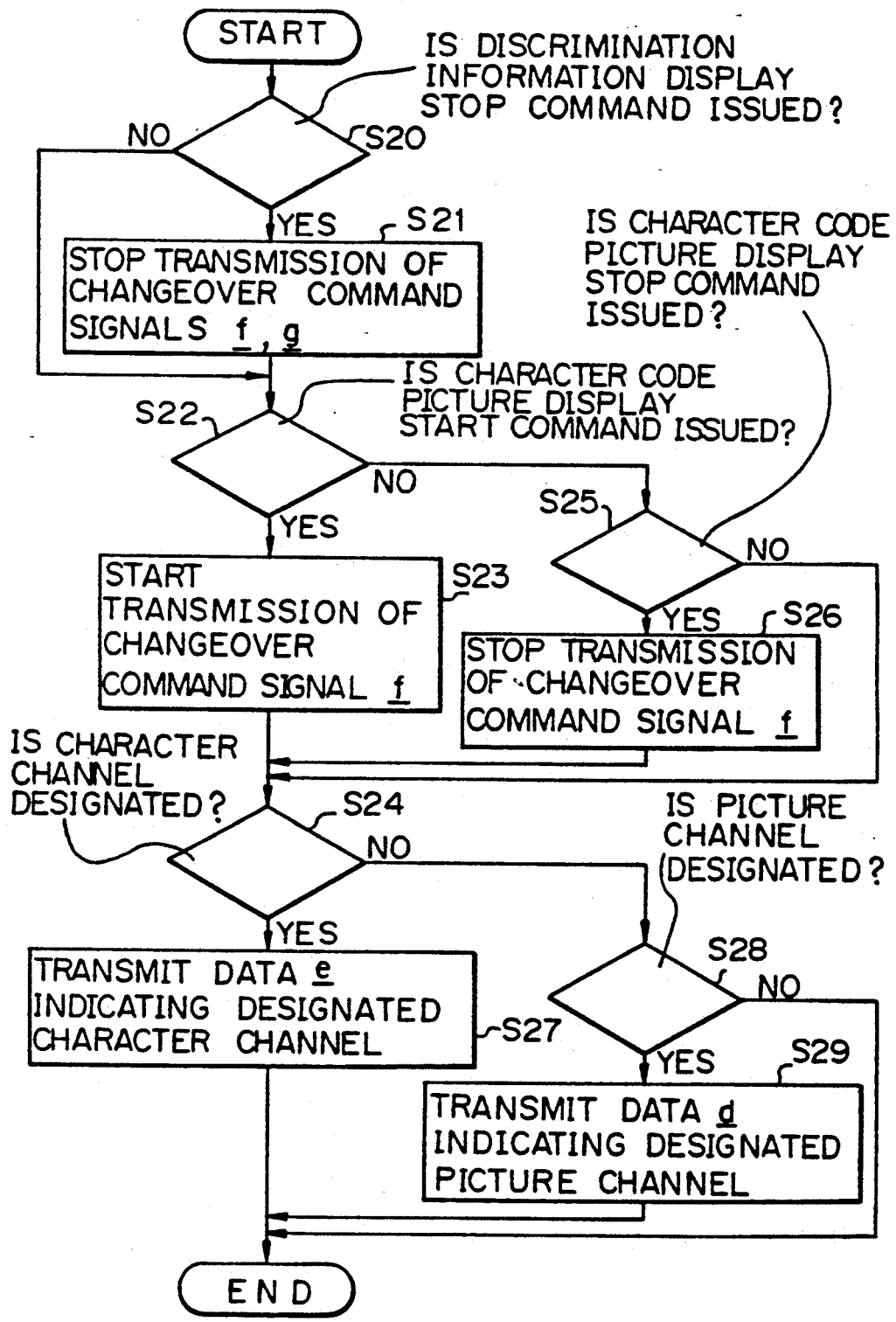
FIG. 18 is a block diagram specifically showing the construction of the coded information signal demodulating and processing circuit 31 in the apparatus shown in FIGS. 14A through 14C.

Operations of the processor in the system controller 32 in the above configuration will be specifically explained with reference to the flowcharts of FIGS. 17 and 18.

Assume that a composite disc is set in a playback position. When a start command is issued in this state, the processor transmits a drive command to the motor driving circuit 71, so that the slider motor 24 is driven to move the pickup 22 to an innermost peripheral position (step S1). If it is detected that the pickup 22 has reached the innermost peripheral position by means of a detector switch of any usual configuration (not shown), the processor executes a focusing operation of the pickup 22, and performs the read-in of index code information which is recorded in a audio lead-in area at an innermost peripheral area of the disc (step S2). Subsequently, the processor judges as to whether or not there is information recorded as the subcode, by the codes in the data field of the data block constituted by the channel R bits forming the subcode in the information read out from the lead-in area (step S3). If, in step S3, it is determined that there is information recorded as the subcode, then the processor determines the coding system by means of the code indicating the coding system, and in turn transmits the codes corresponding to the character group indicating the detected coding system and the codes representing each of the not-more-than 4 characters indicating the content of the information recorded together with the code indicating the coding system, to the memory control circuit 102, and writes them in predetermined area of the RAM 101 (step S4).

Then, the processor starts transmission of the changeover command signals f and g (step S5), and subsequently the processor judges whether or not the disc being set is a composite disc or not, on the basis of predetermined bits in the control field of the data block constituted by the channel Q bits forming the subcode in the information read out from the lead-in area (step S6). If it is judged that the disc being set is a compact disc, then the execution directly proceeds to a CD playback mode (step S7) and a playback operation is continuously performed unless any command for the programmed music selecting operation, for example, has been issued. Since the playback operation in the CD playback mode itself is well known, the explanation thereof is omitted here. If it is judged in step S3 that there is no information recorded as the subcode, the processor directly proceeds to the step S6.

If it is judged in step S6 that the disc being set is a composite disc, the processor immediately accelerates the slider motor 21 to a maximum rated speed of rotation for the video area (step S8). At the same time, the processor moves the pickup 22 toward the outer periphery of disc at a high speed by driving the slider motor 24 at a high speed (step S9). After these operations, when it is detected that the pickup 22 has reached to the video area by the detection signal from the position detector 70 (step S10), the processor starts the playback operation of the video area (step S11). During video area playback, the processor performs the control operation for writing the video information of at least one field (or one frame) long obtained from the disc, in the video memory 83. This video information to be written may be, for example, first information in the video area, or designated by an address designation through the key operation of the operation part 60.

If it is detected that the playback of the video area has been completed, in step S12, then the processor decelerates the spindle motor 21 to the maximum rated speed of rotation for the CD area (step S13). At the same time, the processor drives the slider motor 24 at a high speed, to move the pickup 22 to the innermost peripheral position of the disc at a high speed (step S14). If it is detected (step S15) that the pickup 22 has reached the innermost peripheral position by the detection output signal of the above mentioned detector switch (not illustrated), the processor starts playback operation of the CD area (step S16). Concurrently to this, the selector switch 80 in the video format signal demodulating and processing circuit 30 is changed over by the processor to the position b thereby selecting and outputting the video information which was written in the video memory 83 during video area playback. Thus, playback of a still picture is performed during CD area playback. When the completion of the CD area playback is detected by reading the information of audio lead-out (step S17), the processor initiates the driving of the slider motor 24 to move the pickup 22 to its home position (step S18) unless any operational command is present. Furthermore, a loading mechanism (not shown in the drawings) performs disc ejection (step S19), to complete the sequence of playback operations.

During the execution of the main routine, the processor proceeds to step S20, by the interruption by the timer for example, so as to judge whether or not a display stop command for stopping the display of the discrimination information is issued. If it is judged, in step S20, that the display stop command is issued, the processor stops the transmission of the changeover command signal g (step S21), and judges as to whether or not the start of the display of the picture by the character codes is commanded by a key operation in the operation part 60 (step S22). If it is judged, in step S20, that the display stop command is not issued, the processor directly proceeds to step S22.

If it is judged, in step S22, that the start of the display of the picture by the character codes is commanded, the processor starts the transmission of the changeover command signal f (step S23), and judges as to whether or not the designation of character channel is performed by a key operation in the operation part 60 (step S24).

If, on the other hand, it is judged in step S22 that the start of the display of the picture produced from the character codes is not commanded, the processor judges whether or not the stop of the display of the picture produced from the character codes is commanded (step S25). If it is judged, in step S25, that the stop of the display of the picture by the character codes is commanded, the processor stops the transmission of the changeover command signal f (step S26), and proceeds to step S24. If, on the other hand, it is judged in step S25 that the stop of the display of the picture by the character codes is not commanded, the processor directly proceeds to the step S24.

If it is detected in step 24 that the designation of character channel is performed, the processor transmits the channel designation data e indicating the designated character channel to the memory control circuit 92 (step S27), and restarts the execution of the routine which was being performed immediately before the shift to step S20. If, on the other hand, it is detected in step S24 that the designation of character channel is performed, the processor judges as to whether or not the designation of picture channel is performed (step S28). If it is judged in step S28 that the designation of picture channel is performed, the processor transmits the channel designation data $\underline{d}$ indicating the designated picture channel to the memory control circuit 57 (step S29), and restarts the execution of the routine which was being executed immediately before the shift to the step S20.

If it is detected, by steps S3 through S5 in the operation described above, that there is information recorded as the subcode, the codes corresponding to the character group indicating the coding system which is detected by the code indicating the coding system recorded as the subcode in the lead-in area, and the codes respectively indicating each of not-more-than four characters representing the content of the information recorded together with the codes indicating the coding system, are written in the RAM 101, and in turn read out in a predetermined order. Specifically, code groups indicating each of a plurality of characters arranged in the horizontal direction as characters of the first line are sequentially read out repeatedly twenty-four times, and subsequently code groups indicating each of a plurality of characters arranged as characters of the second line are sequentially read out repeatedly twenty-four times This read-out operation is performed for the whole area.

Since the transmission of the changeover command signal $\underline{g}$ is started in step S5, the codes read out from the RAM 101 are supplied to the character generator 93. From the character generator 93, data corresponding to the luminance signals produced by scanning each character group arranged in the horizontal direction is outputted by means of the code read out from the RAM 101 and the output data of the modulo-24 counter 89. This output data of the character generator 93 is converted to the serial data at the parallel-to-serial converting circuit 94, and in turn supplied to the level converting circuit 95, thereby forming the luminance signals produced by scanning each character group arranged in the horizontal direction. This luminance signal is supplied to one of the input terminals of the change over switch 97. On the other hand, the output signal of the changeover control signal generating circuit 96, which generates the control signal based on the output signal of the parallel-to-serial converting circuit 94, is supplied to one of the input terminals of the changeover switch 98. Since the transmission of the changeover command signal $\underline{f}$ is started together with the changeover command signal $\underline{g}$ in this state, the changeover switches 97 and 98 start to selectively output the luminance signal from the level converting circuit 95 and the control signal from the changeover control signal generating circuit 96 respectively. As a result, when the level of the luminance signal corresponding to the pattern of the characters indicated by the code stored in the RAM 101 becomes the white level, the mixing ratio of the luminance signal becomes 100%. Thus, the characters produced from the codes stored in the RAM 101 are superimposed on the picture produced from the video format signal outputted from the video format signal demodulating and processing circuit 30 so that the coding system and the content of the information recorded as the subcode are displayed. In this way the selection of information can be easily performed by commanding the start and stop of the display of the picture produced from the character codes, by means of the key operation in the operation part 60.

In the operating sequence described above, playback of the information recorded in the CD area of the composite disc is performed in steps S13 through S17 after the playback of information recorded in the video area of the composite disk in steps S8 through S12. If the "load CLUT color 0 through color 7" instructions and the "load CLUT color 8 through color 15" instructions are decoded by the mode/instruction decoder 53 during video area playback, data of designated 16 colors among 4096 colors are held in the CLUT 58.

In this state, if the stop of the display of the discrimination information is commanded while the start of the display of the picture produced from the character codes is not commanded and the picture channel is designated by the key operation in the operation part 60, then the transmission of the changeover command signal $\underline{f}$ and $\underline{g}$ is stopped through the operation of the steps S20 and S21, and the channel designation data $\underline{d}$ indicating the designated channel is supplied to the memory control circuit 57 through steps S28 and S29.

If the "write font foreground/background" instruction etc. are decoded in this state, only picture data of the channel designated by the channel designation data $\underline{d}$ is stored in the RAM 56 by means of the memory control circuit 57. Then the picture data stored in the RAM 56 is sequentially read out. When the read-out picture data is supplied to the CLUT 58, color data of a color number indicated by the picture data is outputted from the CLUT 58. A video format signal based on this color data is outputted from the analog video converting circuit 65, and supplied to the video switch 33.

Figure 19:
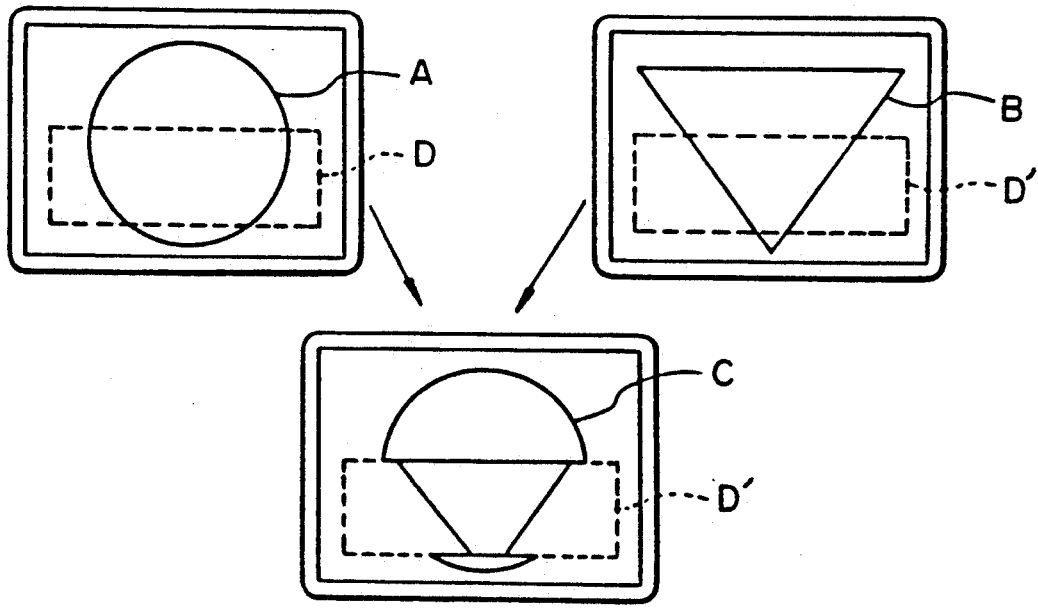

If the "load TCT" instruction according to the picture information recording and reproducing system using the subcode which has been separately proposed by the applicant of the present application and others is decoded in this state, the transparency control bits TCB-0 through TCB-15 respectively corresponding to each color number are held in the TCT 66. Among the TCB-0 through TCB-15 being held, one corresponding to the color number indicated by the data read-out from the picture memory device 55 is selectively outputted from the TCT 66, and the mixing ratio at the video switch 33 is designated by the output of the TCT 66. Thus, the mixing ratio between the video format signal outputted from the analog-to-video converting circuit 65 and the video format signal outputted from the video format signal demodulating and processing circuit 30 is controlled for each pixel. Consequently, a combination of pictures such as illustrated in FIG. 19 is made possible. Specifically, the mixing ratio is set to 100% for a portion corresponding to each pixel outside a region D of a picture A based on the video format signal outputted from the video format signal demodulating and processing circuit 30, and set to 0% for a portion corresponding to each pixel within the region D. On the other hand, the mixing ratio is set to 0% for a portion corresponding to each pixel outside a region D' of a picture B based on the video format signal outputted from the analog-to-video converting circuit 65, and set to 100% for a portion corresponding to each pixel within the region D' of the picture B. Then a picture C can be formed by combining the portion of the picture A outside the region D and and the portion of the picture B within the region D'.

In this way, it is possible to compose a picture as illustrated in FIGS. 20A through 20C, in which a caption, a musical score, or an explanation of a scene, etc., obtained from the subcode is inserted into a moving picture obtained by the video format signal recorded in the video area or a still picture obtained by the video memory 83.

On the other hand, when the character code processing command is decoded, the character codes are stored in the RAM 91, and read out in a predetermined order. Specifically, code groups indicating each of a plurality of characters arranged in the horizontal direction as characters of the first line are sequentially read out repeatedly twenty-four times, and subsequently code groups indicating each of a plurality of characters arranged as characters of the second line are sequentially read out repeatedly twenty-four times. This read-out operation is performed for the whole area. In this time, if the stop of the display of the discrimination information is commanded by the key operation in the operation part 60, the transmission of the changeover command signal g is stopped by the steps S20 and S21. Therefore, the character codes read out from the RAM 91 are supplied to the character generator 93. From the character generator 93, the data corresponding to luminance signals produced by scanning each character group arranged in the horizontal direction is outputted in accordance with the character codes read out from the RAM 91, and the output data of the modulo-24 counter 89. This output data of the character generator 93 is converted to serial data by means of the parallel-to-digital converting circuit 94, and in turn supplied to the level converting circuit wherein the luminance signal obtained by scanning each character group arranged in the horizontal direction is generated. This luminance signal is supplied to one of the input terminals of the changeover switch 97. The output signal of the changeover control signal generating circuit 96 for generating the control signal according to the output of the parallel-to-serial converting circuit 94 is supplied to on of the input terminals of the changeover switch 98.

If, in this state, the start of the display of the picture produced from the character codes is commanded by the key operation in the operation part 60, then the transmission of the changeover command signal f is started through steps S22 and S23, so that changeover switches 97 and 98 start to selectively output the luminance signal from the level converting circuit 95 and the control signal from the changeover control signal generating circuit 96. As a result, when the level of the luminance signal corresponding to the pattern of the characters indicated by the character codes becomes equal to the level corresponding to the white level, the mixing ratio of this luminance signal becomes 100%. Thus, the characters according to the character codes are displayed as being superimposed on the picture produced from the video format signal outputted from the video format signal demodulating and processing circuit 30.

As specifically explained in the foregoing, the information recording and reproducing system according to the present invention is characterized in that, in addition to the code information signal, the subcode is recorded together with the identification code for identifying the coding system of the subcode in the first area of the recording medium, and the identification code and the content discrimination information indicating the content of information included in the subcode by the subcode system indicated by the identification code are recorded in the second area of the recording medium. By this feature, it is made possible to record and reproduce character information by recording and reproducing a single character code having a predetermined number of bits, instead of recording information of each of the whole pixels in the area which is necessary to display the pattern of the character. Therefore, the recording density of the information by the subcode is substantially increased. In addition, by the display of the information recorded in the second area at the time of playback, it is clearly indicated as to which of information by the subcode according to several subcode systems should be selected for obtaining the desired information. The selection of information is facilitated considerably in this way.

What is claimed is:

1. A method of recording information comprising the steps of:
    inserting character codes and identification codes as a subcode to a digital audio signal to form a program section of a coded information signal, wherein said identification codes indicate a particular coding system of a plurality of possible coding systems of said character codes;
    recording said program section of said coded information signal on a program recording area of a recording medium;
    inserting said identification codes and content discrimination codes as a subcode to said digital audio signal to form a leader section of said coded information signal, wherein said content discrimination codes indicate contents of information included in the subcode according to said particular coding system indicated by said identification codes; and
    recording said leader section of said coded information signal on a lead-in area of said recording medium.

2. The method of claim 1, wherein said character codes are inserted as a first portion of a subcode block and said identification codes are inserted as a second portion of said subcode block, the subcode block being inserted as said subcode to said digital audio signal forming said program section.

3. A method of recording and reproducing information comprising the steps of:
    inserting character codes, and identification codes as a subcode to a digital audio signal to form a program section of a coded information signal, wherein said identification codes indicate a particular coding system of a plurality of possible coding systems of said character codes;
    recording said program section of said coded information signal on a program recording area of a recording medium;
    inserting said identification codes and content discrimination codes as a subcode to said digital audio signal to form a lead-in section of said coded information signal, wherein said content discrimination code indicate contents of information included in the subcode according to said particular coding system indicated by said identification codes;
    recording said leader section of said coded information signal on a lead-in area of said recording medium; and
    at the time of playback of said recording medium, displaying at least either said coding system indicated by said identification codes or, said contents of information indicated by said content discrimination codes recorded in said lead-in area of said recording medium.

4. The method of claim 3, wherein said character codes are inserted as a first portion of a subcode block and said identification codes are inserted as a second portion of said subcode block, the subcode block being inserted as said subcode to said digital audio signal forming said program section.

5. An apparatus for playing a picture information recording medium having a program recording area in which character codes are recorded as a subcode to a coded information signal, a lead-in area, and identification codes for identifying a particular coding system of a plurality of possible coding systems of said character codes, the identification codes being recorded in at least one of the program area of a lead-in area as a further subcode to said coded information signal, said apparatus comprising:
- pick-up means for reading signals recorded on said recording medium and generating a pick-up output signal including said coded information signal;
- character code demodulating means for detecting said particular coding system based on said identification codes contained in said coded information signal from said pickup output signal, and for demodulating said character codes contained in said coded information signal; and
- video signal generating means for generating a video signal corresponding to designated characters, in response to an output signal of said character code demodulating means.

6. The apparatus of claim 5, in which the recording medium further includes content discrimination codes, for indicating at least one of the contents of information included in the character codes and of said particular coding system identified by said identification codes, recorded as a yet further subcode to said coded information signal, wherein the character code demodulating means is adapted for demodulating said content discrimination codes contained in said coded information signal, and the video signal generating means is adapted for generating a video signal corresponding to further designated characters indicating said at least one of the contents of information included in the character codes and of said particular coding system identified by said identification codes.

7. A method of recording and reproducing audio and picture information to and from a recording medium, the method comprising the steps of:
- generating an audio signal to be recorded on the recording medium;
- generating character codes representative of picture information, said step of generating character codes comprising:
  - generating a subcode block comprising a predetermined number of subcodes, each of said subcodes comprising a fixed number of subcode binary bits, a subcode symbol being defined by a preset number of adjacent subcode binary bits;
  - designating channels of instructions as the aggregate of corresponding subcode binary bits in each of said subcode symbols;
  - designating a group of bits comprising a predetermined number of bits in each channel as a data field;
  - designating a first group comprising a plurality of bits in each data field as a code for indicating the presence or absence of information recorded as a subcode;
  - designating a second group comprising a plurality of bits in each data field as a code for indicating a particular one of a plurality of coding systems corresponding to the picture information of the subcode;
  - designating a third group comprising a plurality of bits in each data field as a code for indicating a particular one of a plurality of coding systems corresponding to the picture information of the subcode;
  - designating a third group comprising a plurality of bits in each data field as a code representing one of a predetermined number of characters comprising said picture information;
- digitizing the audio signal to generate a digital audio signal;
- inserting the character as a subcode to the digital audio signal to form a coded information signal;
- recording the coded information signal on the recording medium;
- reproducing the audio information from the recording medium comprising the steps of:
  - reading the coded information signal;
  - determining the presence or absence of a subcode to said digital audio signal based on said first group of subcode binary bits;
  - determining the particular one of the coding system for decoding said character codes based on said second group of subcode binary bits upon determining the presence of a subcode to said digital audio signal;
  - decoding the third group of subcode binary bits for generating said characters according to said particular one of the coding systems; and
- mixing the picture information corresponding to the characters with a video format signal.

8. A method of recording audio and information to a recording medium having the method comprising the steps of:
- generating an audio signal to be recorded on the recording medium;
- generating character codes representative of picture information, said step of generating character codes comprising:
  - generating a subcode block comprising a predetermined number of subcodes, each of said subcodes comprising a fixed number of subcodes, each of said subcodes comprising a fixed number of subcode binary bits, a subcode symbol being defined by a preset number of adjacent subcode binary bits;
  - designating channels of instructions as the aggregate of corresponding subcode binary bits in each of said subcode symbols;
  - designating a group comprising a predetermined number of bits in each channel as a data field;
  - designating a first group comprising a plurality of bits in each data field as a code for indicating the presence or absence of information recorded as a subcode;
  - designating a second group comprising a plurality of bits in each data field as a code for indicating a particular one of a plurality of coding systems corresponding to the picture information of the subcode;
  - designating a third group comprising a plurality of bits in each data field as a code representing one of a predetermined number of characters comprising said picture information;

digitizing the audio signal to generate a digital audio signal;

inserting the character codes as a subcode to the digital audio signal to form a coded information signal;

recording the coded information signal on the recording medium.

9. A method of recording information comprising the steps of:

inserting character codes and identification codes as a subcode to a digital audio signal to form a program section of a coded information signal, wherein said identification codes indicate a particular coding system of a plurality of possible coding systems of said character codes;

recording said program section of said coded information signal on a program recording area of a recording medium; and inserting content discrimination codes as a subcode to said digital audio signal to form a leader section of a coded information signal, wherein said content discrimination codes indicate contents of information included in the subcode according to said particular coding system indicated by said identification codes;

recording said leader section of said coded information signal on a lead-in area of said recording medium.

10. The method of claim 1, wherein said character codes are inserted as a first portion of a subcode block and said identification codes are inserted as a second portion of said subcode block, the subcode block being inserted as said subcode to said digital audio signal forming said program section.

11. A method of recording and reproducing information comprising the steps of:

inserting character codes, and identification codes as a subcode to a digital audio signal to form a program section of a coded information signal, wherein said identification codes indicate a particular coding system of a plurality of possible coding systems of said character codes;

recording said program section of said coded information signal on a program recording area of a recording medium;

inserting content discrimination codes as a subcode to said digital audio signal to form a leader section of a coded information signal, wherein said content discrimination codes indicate contents of information included in the subcode according to said particular coding system indicated by said identification codes;

recording said leader section of said coded information signal on a lead-in area of said recording medium; and at the time of playback of said recording medium, displaying said contents of information indicated by said content discrimination codes recorded in said lead-in area of said recording medium.

12. The method of claim 11, wherein said character codes are inserted as a first portion of a subcode block and said identification codes are inserted as a second portion of said subcode block, the subcode block being inserted as said subcode to said digital audio signal forming said program section.

13. A method of recording information comprising the steps of:

inserting character codes as a subcode to a digital audio signal to form a program section of a coded information signal;

recording said program section of said coded information signal on a program recording area of a recording medium;

inserting identification codes and content discrimination codes as a subcode to a digital audio signal to form a leader section of a coded information signal, wherein aid identification codes indicate a particular coding system of a plurality of possible coding systems of said subcode, and said content discrimination codes indicate contents of information included in the subcode according to said particular coding system indicated by said identification codes; and recording said leader section of said coded information signal on a lead-in area of said recording medium.

14. The method of claim 13, wherein said content discrimination codes are inserted as a first portion of a subcode block and said identification codes are inserted as a second portion of said subcode block, the subcode block being inserted as said subcode to said digital audio signal forming said lead-in section.

15. A method of recording information comprising the steps of:

inserting character codes as a subcode to a digital audio signal to form a program section of a coded information signal;

recording said program section of said coded information signal on a program recording area of a recording medium;

inserting identification codes and content discrimination codes as a subcode to a digital audio signal to form a leader section of a coded information signal, wherein aid identification codes indicate a particular coding system of a plurality of possible coding systems of said subcode, and said content discrimination codes indicate contents of information included in the subcode according to said particular coding system indicated by said identification codes;

recording said leader section of said coded information signal on a lead-in area of said recording medium.

inserting identification codes and content discrimination codes as a subcode to a digital audio signal to form a leader section of a coded information signal, wherein aid identification codes indicate a particular coding system of a plurality of possible coding systems of said subcode, and said content discrimination codes indicate contents of information included in the subcode according to said particular coding system indicated by said identification codes; and recording said leader section of said coded information signal on a lead-in area of said recording medium; and at the time of playback of said recording medium, displaying at least either of said coding system indicated by said identification codes and said contents of information indicated by said content discrimination codes recorded in said lead-in area of said recording medium.

16. The method of claim 15, wherein said content discrimination codes are inserted as a first portion of a subcode block and said identification codes are inserted as a second portion of said subcode bloc, the subcode block being inserted as said subcode to said digital audio signal forming said lead-in section.

* * * * *